US010472447B2

(12) United States Patent
Jasinska-Walc et al.

(10) Patent No.: US 10,472,447 B2
(45) Date of Patent: Nov. 12, 2019

(54) PROCESS FOR THE PREPARATION OF A GRAFT COPOLYMER COMPRISING A POLYOLEFIN MAIN CHAIN AND ONE OR A MULTIPLE POLYMER SIDE CHAINS AND THE PRODUCTS OBTAINED THEREFROM

(71) Applicant: SABIC GLOBAL TECHNOLOGIES B.V., Bergen op Zoom (NL)

(72) Inventors: Lidia Jasinska-Walc, Eindhoven (NL); Robbert Duchateau, Eindhoven (NL); Miloud Bouyahyi, Eindhoven (NL); Lukasz Szymon Rutkowski, Gdansk (PL); Shaneesh Vadake Kulangara, Roermond (NL); Arkadiusz Zych, Gdansk (PL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 185 days.

(21) Appl. No.: 15/537,234

(22) PCT Filed: Dec. 17, 2015

(86) PCT No.: PCT/EP2015/080337
§ 371 (c)(1),
(2) Date: Jun. 16, 2017

(87) PCT Pub. No.: WO2016/097204
PCT Pub. Date: Jun. 23, 2016

(65) Prior Publication Data
US 2017/0320988 A1 Nov. 9, 2017

(30) Foreign Application Priority Data
Dec. 17, 2014 (EP) .................... 14198480

(51) Int. Cl.
C08F 255/02 (2006.01)
(52) U.S. Cl.
CPC .................. C08F 255/02 (2013.01)
(58) Field of Classification Search
CPC .................. C08F 4/65927; C08G 81/027
See application file for complete search history.

(56) References Cited

U.S. PATENT DOCUMENTS

| 4,414,132 | A | 11/1983 | Goodall et al. |
| 4,978,648 | A | 12/1990 | Barbé et al. |
| 5,077,357 | A | 12/1991 | Job |
| 5,106,806 | A | 4/1992 | Job |
| 5,556,820 | A | 9/1996 | Funabashi et al. |
| 6,583,237 | B1 | 6/2003 | Imuta et al. |
| 2003/0055179 | A1 | 3/2003 | Ota et al. |
| 2004/0122192 | A1* | 6/2004 | Imuta .................. C08F 210/00 526/127 |
| 2006/0287449 | A1 | 12/2006 | Miyamoto et al. |
| 2008/0234433 | A1* | 9/2008 | Asandei .................. C08F 265/04 525/74 |
| 2009/0048399 | A1 | 2/2009 | Reijntjens et al. |
| 2011/0028657 | A1 | 2/2011 | Clark et al. |
| 2011/0294960 | A1 | 12/2011 | Hillmyer et al. |
| 2014/0039138 | A1 | 2/2014 | Giesbrecht et al. |
| 2014/0039139 | A1 | 2/2014 | Giesbrecht et al. |
| 2014/0039140 | A1 | 2/2014 | Giesbrecht et al. |
| 2014/0200313 | A1 | 7/2014 | Chenal et al. |
| 2014/0350200 | A1 | 11/2014 | Batinas-Geurts et al. |
| 2017/0320987 | A1 | 11/2017 | Bouyahyi et al. |
| 2017/0320989 | A1 | 11/2017 | Duchateau et al. |
| 2017/0349710 | A1 | 12/2017 | Jaskinska-Walc et al. |

FOREIGN PATENT DOCUMENTS

| EP | 1186619 A2 | 3/2002 |
| EP | 1283222 A1 | 2/2003 |
| JP | 2001288272 A | 10/2001 |
| WO | 9319104 A1 | 9/1993 |
| WO | 9613529 A1 | 5/1996 |
| WO | 9632427 A1 | 10/1996 |
| WO | 9742232 A1 | 11/1997 |
| WO | 9742236 A1 | 11/1997 |

(Continued)

OTHER PUBLICATIONS

Kashiwa et al. Journal of Polymer Science: Part A: Polymer Chemistry, vol. 41, 3657-3666 (Year: 2003).*
Amgoune et al., "Controlled ring-opening polymerization of lactide by group 3 metal complexes," Pure Appl. Chem., vol. 79, No. 11, pp. 2013-2030 (2007).
Amgoune et al., "Highly Active, Productive, and Syndiospecific Yttrium Initiators for the Polymerization of Racemic B-Butyrolactone," Angew. Chem. Int. Ed. 2006, 45, 2782-2784.
Amgoune et al., "Ring-Opening Polymerization of Lactide with Group 3 Metal Complexes Supported by Dianionic Alkoxy-Amino-Bisphenolate Ligands: Combining High Activity, Productivity, and Selectivity," Chem. Eur. J. 2006, 12, 169-179.

(Continued)

Primary Examiner — Mark S Kaucher
(74) Attorney, Agent, or Firm — Cantor Colburn LLP

(57) ABSTRACT

The present invention relates to a process for the preparation of a graft copolymer comprising a polyolefin main chain and one or multiple polymer side chains, the process comprising the steps of: copolymerizing at least one first type of olefin monomer and at least one second type of metal-pacified functionalized olefin monomer to obtain a polyolefin main chain having one or multiple metal-pacified functionalized short chain branches, and reacting the polyolefin main chain having one or multiple metal-pacified functionalized short chain branches with at least one metal substituting agent to obtain a polyolefin main chain having one or multiple functionalized short chain branches; and forming one or multiple polymer side chains on the polyolefin main chain, wherein as initiators the functionalized short chain branches on the polyolefin main chain are used to obtain the graft copolymer. The invention also relates to the products obtained therefrom.

13 Claims, No Drawings

(56) References Cited

FOREIGN PATENT DOCUMENTS

| WO | 0069921 A1 | 11/2000 |
|---|---|---|
| WO | 0123441 A1 | 4/2001 |
| WO | 2007134851 A1 | 11/2007 |
| WO | 2011014533 A1 | 2/2011 |
| WO | 2011112897 A1 | 9/2011 |

OTHER PUBLICATIONS

Becquart et al., "Poly[ethylene-co-(vinyl alcohol)]-graft-poly(ε-caprolactone) Synthesis by Reactive Extrusion, 1-Structrual and Kinetic Study(a)," Macromol. Mater. Eng. 2009, 294, 643-650.
Bourissou et al., "Recent advances in the controlled preparation of poly(a-hydroxy acids): Metal-free catalysts and new monomers," C.R. Chimie 10 (2007) 775-794.
Cai et al., "Stereoselective ring-opening polymerization of racemic lactide using alkoxy-amino-bis(phenolate) group 3 metal complexes," Royal Society of Chemistry 2004, Chem. Commun., 2004, 330-331.
Chamberlain et al., "Polymerization of Lactide with Zinc and Magnesium B-Diiminate Complexes: Stereocontrol and Mechanism," J. Am. Chem. Soc. 2001, 123, 3229-3238.
Chen et al., "Cocatalysts for Metal-Catalyzed Olefin Polymerization: Activators, Activation Processes, and Structure-Activity Relationships," Chem. Rev. 2000, 100, pp. 1391-1434.
Cheng et al., "Single-Site Catalysts for Ring-Opening Polymerization: Synthesis of Heterotactic Poly(lactic acid) from rac-Lactide," J. Am. Chem. Soc. 1999, 121, 11583-11584.
Choi et al., Recent Developments in Transition Metal Catalyzed Olefin Polymerization—A Survey. I. Ethylene Polymerization; JMS Review Macromolecular Chemical Physics C25(I), 1-55 (1985).
Dechy-Cabaret et al., "Controlled Ring-Opening Polymerization of Lactide and Glycolide," Chem. Rev. 2004, 104, 6147-6176.
Descour et al., "In situ compatibilisation of alkenyl-terminated polymer blends using cross metathesis," RSC Adv., 2015, 5, pp. 9658-9666.
Ferreira et al., "Tin-Catalyzed Esterification and Transesterification Reactions: A Review," International Scholarly Research Network, 2012, 13 Pages.
Han et al., "Synthesis of Hydroxy-Terminated Polyethylene via Controlled Chain Transfer Reaction and Poly(ethylene-b-caprolactone) Block Copolymer," Macromolecules 2002, 35, pp. 8923-8925.
Helwani et al., "Solid heterogeneous catalysts for transesterification of triglycerides with methanol: A review," Applied Catalysis A: General 363 (2009) 1-10.
International Search Report for International Application No. PCT/EP2015/080337; International Filing Date: Dec. 17, 2015; dated Mar. 23, 2016; 5 Pages.
Kamber et al., "Organocatalytic Ring-Opening Polymerization," Chem. Rev. 2007, 107, 5813-5840.
Kotzabasakis et al., "Synthesis and Characterization of Complex Macromolecular Architectures Based on Poly(a-olefins) Utilizing a Cs-Symmetry Hafnium Metallocene Catalyst in Combination with Atom Transfer Radical Polymerization (ATRP)," Macromolecules 2011, 44, 1952-1968.
Kricheldorf, "Syntheses of Biodegradable and Biocompatible Polymers by Means of Bismuth Catalysts," Chem. Rev. 2009, 109, 5579-5594.
Labourdette et al., "Unusually Stable Chiral Ethyl Zinc Complexes: Reactivity and Polymerization of Lactide," Organometallics 2009, 28, 1309-1319.
Lee et al., "Heterogeneous Base Catalysts for Transesterification in Biodiesel Synthesis," Catal. Surv. Asia (2009) 13:63-77.
Lou et al., "Novel Aliphatic Polyesters Based on Functional Cyclic (Di)Esters," Macromol. Rapid Commun. 2003, 24, 161-172.
Lu et al., "Syntheses of diblock copolymers polyolefin-b-poly(ε-caprolactone) and their applications as the polymeric compatilizer," Polymer 46 (2005) 10585-10591.
Machine Translation of JP2001288272A; Date of Publication: Oct. 16, 2001; 33 Pages.
Makio et al., "Synthesis of Telechelic Olefin Polymers via Catalyzed Chain Growth on Multinuclear Alkylene Zinc Compounds," J. Am. Chem. Soc; 2013, pp. 8177-8180, vol. 135.
Martinez et al., "Ring-opening metathesis polymerization of 8-membered cyclic olefins," Polym. Chem., 2014, 5, pp. 3507-3532.
Nakano et al., "Metal-catalyzed synthesis of steroregular polyketones, polyesters, and polycarbonates," The Royal Society of Chemistry 2003, Dalton Trans., 2003, 4039-4050.
Nomura et al., "Stereoselective Ring-Opening Polymerization of a Racemic Lactide by Using Achiral Salen- and Homosalen-Aluminum Complexes," Chem. Eur. J. 2007, 13, 4433-4451.
O'Keefe et al., "Polymerization of lactide and related cyclic esters by discrete metal complexes," J. Chem. Soc., Dalton Trans., 2001, 2215-2224.
Otera et al., "Esterification: Methods, Reactions, and Applications," Wiley-VCH (2010) 54 Pages.
Otera, "Transesterification," Chem. Rev. 1993, 93, pp. 1449-1470.
Ovitt et al., "Stereochemistry of Lactide Polymerization with Chiral Catalysts: New Opportunities for Stereocontrol Using Polymer Exchange Mechanisms," J. Am. Chem. Soc. vol. 124, No. 7, 2002, pp. 1316-1326.
Ovitt et al., "Stereoselective Ring-Opening Polymerization of meso-Lactide: Synthesis of Syndiotactic Poly(lactic acid)," J. Am. Chem. Soc. 1999, 121, 4072-4073.
Pullukat & Hoff, "Silica-Based Ziegler-Natta Catalysts: A Patent Review," Catal. Rev.—Sci. Eng., 41(3&4), pp. 389-428 (1999).
Qi-Zheng Li et al., "Well-Defined Polyolefin/Poly(ε-caprolactone) Diblock Copolymers: New Synthetic Strategy and Application," Journal of Polymer Science: Part A: Polymer Chemistry, pp. 511-517.
Spassky et al., "Highly steroelective polymerization of rac-(D,L)-lactide with a chiral Schiff's base/aluminum alkozide initiator," Macromol. Chem. Phys. 197, 2627-2637 (1996).
Williams et al., "A Highly Active Zinc Catalyst for the Controlled Polymerization of Lactide," J. Am. Chem. Soc., vol. 125, No. 37, 2003, 11350-11359.
Written Opinion of the International Searching Authority for International Application No. PCT/EP2015/080337; International Filing Date: Dec. 17, 2015; dated Mar. 23, 2016; 7 Pages.
Wu et al., "Recent developments in main group metal complexes catalyzed/initiated polymerization of lactides and related cyclic esters," Coordination Chemistry Reviews 250 (2006) 602-626.
Zhao et al., "Synthesis of well-defined amphiphilic branched polyethylene-graft-poly (N-isopropylacrylamide) copolymers by coordination copolymerization in tandem with RAFT polymerization and their selfassembled vesicles," Polym. Chem., 2014, 5, 962-970.
Zheng et al., "Zinc and enolato-magnesium complexes based on bi-, tri- and tetradentate aminophenolate ligands," New J. Chem., 2008, 32, 2279-2291.
Zhu et al., "Group 13 and Lanthanide Complexes Supported by Tridentate Tripodal Triamine Ligands: Structural Diversity and Polymerization Catalysis," Organometallics 2007, 26, 5395-5405.
Horng et al., "Synthesis of Diblock Polyolefin and Polyester Copolymers Via Hafnium and Stannous Octoate Catalysts," Polymer Preprints, 1996, pp. 639-640, vol. 38, Issue 1.

* cited by examiner

PROCESS FOR THE PREPARATION OF A GRAFT COPOLYMER COMPRISING A POLYOLEFIN MAIN CHAIN AND ONE OR A MULTIPLE POLYMER SIDE CHAINS AND THE PRODUCTS OBTAINED THEREFROM

CROSS REFERENCE TO RELATED APPLICATIONS

This application is a 371 of International Application No. PCT/EP2015/080337, filed Dec. 17, 2015, which claims priority to European Application No. 14198480.7, filed Dec. 17, 2014 which are incorporated herein by reference in their entirety.

The present invention relates to a process for the preparation of a graft copolymer comprising a polyolefin main chain and one or a multiple polymer side chains and the products obtained therefrom.

BACKGROUND

The present invention relates to a process for preparing graft copolymers having a polyolefin main chain containing one or multiple polar or nonpolar polymer side chains and the products obtained therefrom.

Graft copolymers combining a polyolefin main chain with at least one nonpolar polyethylene-like polymer side chain are useful as compatibilizers for e.g. polyolefin (e.g. iPP) and polyethylene blends. The preparation of actual polyolefin-polyethylene graft copolymers (e.g. iPP-g-PE) is a very tedious process.

Graft copolymers combining a polyolefin main chain with at least one type of polar polymer side chain may be used to enhance the properties of polyolefin polymers that have an inherent nonpolar character that leads to drawbacks for certain applications, because of poor adhesion, printability and compatibility that can restrict their efficacy. Furthermore, such graft copolymers are useful as compatibilizers of e.g. polyolefin (e.g. iPP) and polar polymers (e.g. polycarbonate) blends.

It is known that graft copolymers may be prepared using as a main chain a well-defined randomly functionalized polyolefin, containing functionalized short chain branches. This main chain polyolefin is prepared in a separate process to which the side chains are added using an additional catalyst in a subsequent process.

The formation of the polar or nonpolar polymer side chains can either be carried out by growing these polymer side chains from polar functions of the polyolefin main chain (grafting from approach) or by attaching a pre-synthesized polymer to the polar functions of the polyolefin main chain (grafting onto approach).

The aim of the present invention is to provide an easy, versatile and tunable process for the preparation of graft copolymers.

It is moreover an aim of the present invention to produce graft copolymers having a polyolefin main chain and at least one type of polar or nonpolar polymer (preferably polyethylene-like polyester) side chains.

It is moreover an aim of the present invention to provide copolymers that can be used as compatibilizers for blends of polyolefins and polar polymers, such as iPP with polycarbonate, or for blends of polyolefins and nonpolar polymers, such as iPP with PE.

One or more of these aims are obtained by the process according to the present invention.

SUMMARY OF THE INVENTION

The present invention relates to the novel and inventive process for the preparation of graft copolymers comprising a polyolefin main chain and one or a multiple polymer side chains and the products obtained therefrom.

In a first aspect, the present invention relates to a process for the preparation of a graft copolymer comprising a polyolefin main chain and one or multiple polymer side chains, the process comprising the steps of:
A) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising:
  i) a metal catalyst or metal catalyst precursor comprising a metal from Group 3-10 of the IUPAC Periodic Table of elements;
  ii) optionally a co-catalyst;
B) reacting the polyolefin main chain having one or multiple metal-pacified functionalized short chain branches obtained in step A) with at least one metal substituting agent to obtain a polyolefin main chain having one or multiple functionalized short chain branches;
C) forming one or multiple polymer side chains on the polyolefin main chain, wherein the functionalized short chain branches on the polyolefin main chain obtained in step B) are used to obtain the graft copolymer.

In an embodiment, the catalyst system further comprises:
iii) optionally a scavenger.

Step C) may be carried out for example by ring-opening polymerization (ROP) and/or transesterification.

In an embodiment, the first type of olefin monomer is a compound according to Formula I-A:

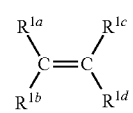

Formula I-A wherein C is carbon and wherein $R^{1a}$, $R^{1b}$, $R^{1c}$, and $R^{1d}$ are each independently selected from the group consisting of H or hydrocarbyl with 1 to 16 carbon atoms.

In another embodiment, the second type of metal-pacified functionalized olefin monomer is a compound according to Formula I-B:

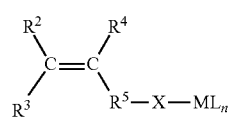

Formula I-B wherein C is carbon;
wherein $R^2$, $R^3$, and $R^4$ are each independently selected from the group consisting of H or hydrocarbyl with 1 to 16 carbon atoms, and wherein $R^5$—X-ML$_n$ is a main group metal pacified heteroatom-containing functional group, wherein X is a heteroatom or a heteroatom-containing group, wherein the heteroatom that is bonded to M is selected from the group consisting of O, S and N; wherein $R^5$ is a hydrocarbyl with 1 to 16 carbon atoms, alternatively $R_3$ and $R_5$ can be linked to form a ring structure. This means that the heteroatom or a heteroatom-containing group is a nucleophilic group pacified by an electrophilic pacifying metal M. The pacifying metal M used to obtain the metal-pacified functionalized olefin monomer can be selected for example from the group consisting of: magnesium, calcium, boron, aluminum, gallium, bismuth, titanium, zinc, and one or more combinations thereof.

In yet another embodiment, step B) is carried out directly after step A) and/or wherein step C) is carried out directly after step B), preferably in a series of connected reactors, preferably continuously.

In yet another embodiment, during step C) a catalyst for the ROP and/or transesterification is added.

In yet another embodiment, the metal catalyst used in step A) comprises a metal from Group 3-8, preferably Group 3-6, more preferably from Group 3-4 of the IUPAC Periodic Table of elements and/or wherein the metal catalyst used in step A) comprises a metal selected from the group consisting of Ti, Zr, Hf, V, Cr, Fe, Co, Ni, Pd, preferably Ti, Zr or Hf.

In an embodiment, said catalyst can be a Ziegler-Natta catalyst, such as for example titanium-magnesium and aluminum based Ziegler-Natta catalysts, especially obtained for example by reacting a titanium alkoxy with a magnesium alkoxy and subsequently reaction the reaction product with an aluminum alkyl halide, or a catalyst based on a Group 4 metal, which can especially be for example a metallocene, half-metallocene or a post-metallocene and/or a single-site catalyst.

In an embodiment, a catalyst precursor can be for example a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethyl silyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

In an embodiment, said catalyst precursor can be for example a so-called half-metallocene, or constrained geometry catalyst, even more preferably, $C_5Me_5[(C_6H_{11})_3P=N]$TiCl$_2$, [Me$_2$Si(C$_5$Me$_4$)N(tBu)]TiCl$_2$, [C$_5$Me$_4$(CH$_2$CH$_2$NMe$_2$]TiCl$_2$.

In an embodiment, said catalyst can be for example a so-called post-metallocene, preferably [Et$_2$NC(N(2,6-iPr$_2$-C$_6$H$_3$)]TiCl$_3$ or [N-(2,6-di(1-methylethyl)phenyl)amido)(2-isopropylphenyl)(α-naphthalen-2-diyl(6-pyridin-2-diyl)methane)]hafnium dimethyl.

In yet another embodiment, the co-catalyst is selected from the group consisting of aluminum alkyls and aluminum alkyl halides, such as for example triethyl aluminum (TEA) or diethyl aluminum chloride (DEAC), MAO, DMAO, MMAO, SMAO and/or fluorinated aryl borane or fluorinated aryl borate.

In yet another embodiment, the scavenger is selected from the group consisting of aluminum alkyls, such as triisobutyl aluminum, trioctyl aluminum, trimethyl aluminum, MAO, MMAO, SMAO, zinc alkyls, such as diethyl zinc, or magnesium alkyls such as dibutyl magnesium. In an embodiment, the scavenger is the same compound as the co-catalyst. In another embodiment, the scavenger is a different compound than the co-catalyst. The scavenger may also function as a chain transfer agent.

In yet another embodiment, the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodeceme, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

In yet another embodiment, the cyclic monomer used during ROP in step C) is a polar monomer, selected from the group consisting of a lactone, a lactide, a cyclic oligoester such as a di-ester, a tri-ester, a tetra-ester, a penta-ester or higher oligoesters, an epoxide, an aziridine, a combination of epoxide and/or aziridine and CO$_2$, a cyclic anhydride, a combination of epoxide and/or aziridine and a cyclic anhydride, a combination of epoxide and/or aziridine and CO$_2$ and a cyclic anhydride, a cyclic N-carboxyanhydride, a cyclic carbonate, a lactam and one or more combinations thereof, preferably a lactone.

In yet another embodiment, the cyclic monomer used during ROP in step C) is a cyclic monomer selected from macrolactones and/or macrooligolactones, preferably with at least 10 consecutive carbon atoms in the ring/cycle, cyclic carbonates, cyclic amides, cyclic urethanes and cyclic ureas; or one or more combinations thereof, preferably macrolactones.

In another aspect of the present invention, the invention relates to a graft copolymer obtained by or obtainable by a process according to the present invention.

Definitions

The following definitions are used in the present description and claims to define the stated subject matter. Other terms not cited below are meant to have the generally accepted meaning in the field.

"graft copolymer" as used in the present description means: a macromolecule with one or more side chains connected to a main chain. These side chains may have constitutional or configurational features that differ from those in the main chain, preferably the side chains comprise at least one different monomer compared to the main chain.

"main chain" as used in the present description means: the linear polymer chain to which all other chains may be regarded as being pendant. The main chain is preferably also the polymer chain starting from which other chains/side chains may be obtained. The main chain is thus obtained in step A).

"side chain" or "branch" or "polymer branches" or "polymer side chains" as used in the present description means: an offshoot from a polymer main chain. These terms can be used interchangeably. This offshoot may be oligomer or polymeric and might be similar or different in nature compared to the polymer main chain. A "side chain" or "branch" or "polymer branches" or "polymer side chains" can thereby also be a random or block copolymer comprising at least two different monomers. "Side-chains" can be obtained staring from the main chain. "Side-chains" can thereby be obtained in step C).

"short chain branch" as used in the present description means: a branch that comprises between 1 and 100 carbon atoms, preferably 1 to 50 carbon atoms, further preferred 1 to 20 carbon atoms, most preferably 2 to 8 carbon atom. Short chain branches are preferably much smaller than the backbone of the linear molecule to which they are attached.

"pacifying agent" as used in the present description means: an agent that blocks or protects a functional group to reversibly deactivate that functional group.

"metal-pacified functionalized olefin monomer" as used in the present description means: an olefin monomer having a reactive function which reactive function has reacted with a metal hydride or hydrocarbyl, preferably a metal alkyl. It is a functionalized olefin monomer that is pacified using a metal in order to reversibly deactivate the functional group.

"metal-pacified functionalized short chain branches" as used in the present description means: short chain branches having a reactive function which reactive function has reacted with a metal. It is a functionalized short chain branch that is pacified using a metal in order to reversibly deactivate the functional group.

"hydrocarbyl" as used in the present description means: a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents. Hence, when in the present description "hydrocarbyl" is used it can also be "substituted hydrocarbyl", unless stated otherwise. Included in the term "hydrocarbyl" are also perfluorinated hydrocarbyls wherein all hydrogen atoms are replaced by fluorine atoms. A hydrocarbyl may be present as a group on a compound (hydrocarbyl group) or it may be present as a ligand on a metal (hydrocarbyl ligand).

"polyethylene-like block" or "polyethylene-like polymer" or "polyethylene-like polymer block" as used in the present description refers a polymer or polymer block that is at least partially miscible with polyethylene that includes but is not limited to for example polyethylene-like polyester blocks. Such kind of polymers or polymer blocks may contain at least 60 mol % of monomer units with at least 10 consecutive between carbonyl group-containing functionalities. So, in the context of the present invention, polyethylene-like polymers are considered to be nonpolar.

"ring-opening polymerization" or "ROP" may also include the copolymerization of cyclic monomers with carbon dioxide (e.g. epoxide+$CO_2$).

"metal substituting agent" as used in the present description means: an agent or a reagent that is suitable for substituting the metal of by a non-metal atom or group. It may for example be a hydrolyzing agent.

"Pol" as used in the present description means: polyolefin.

"PE" as used in the present description means: polyethylene.

"LDPE" as used in the present description means: low density polyethylene.

and "LLDPE" as used in the present description means: linear low density polyethylene. LDPE and LLDPE thereby encompass polyethylene with a density for example between 0.85 and 0.95 kg/m³, that can thus also includes especially for example VLDPE and MDPE.

"HDPE" as used in the present description means: high density polyethylene.

"CL" as used in the present description means: ε-caprolactone.

"PCL" as used in the present description means: polycaprolactone.

"PLA" as used in the present description means: polylactide (L, D or DL lactide can be used).

"aPP" as used in the present description means: atactic polypropylene.

"iPP" as used in the present description means: isotactic polypropylene.

"sPP" as used in the present description means: syndiotactic polypropylene.

"EB" as used in the present description means: cyclic ethylene brassylate.

"PEB" as used in the present description means: polyethylene brassylate.

"Amb" as used in the present description means: ambrettolide.

"PAmb" as used in the present description means: polyambrettolide.

"BA" as used in the present description means: cyclic butylene adipate.

"PBA" as used in the present description means: polybutyladipate.

"BS" as used in the present description means: cyclic butylene succinate.

"PBS" as used in the present description means: polybutylsuccinate.

"aPS" as used in the present description means: atactic polystyrene.

"iPS" as used in the present description means: isotactic polystyrene.

"sPS" as used in the present description means: syndiotactic polystyrene.

"PDL" as used in the present description means: pentadecalactone.

"PPDL" as used in the present description means: polypentadecalactone.

"P4M1P" as used in the present description means: poly-4-methyl-1-pentene.

"iP4M1P" as used in the present description means: isotactic poly-4-methyl-1-pentene.

"transesterification" as used in the present description means: a process of exchanging a nucleophilic alkoxide group of a carboxylic or carbonic acid ester. Transesterification is a special type of nucleophilic substitution using an ester or carbonate functional group.

"HT SEC" as used in the present description means: high temperature size exclusion chromatography.

"polydispersity index ($Đ$)" as used in the present description means: a value that indicates the distribution of the sizes of polymer molecules ($M_w/M_n$). The method of measuring the $Đ$ is explained below. $M_n$ is the number average molecular weight and $M_w$ is the weight average molecular weight.

"chain transfer agent" as used in the present description means: a compound that is capable of reversibly or irreversibly interchanging hydrocarbyls with the active catalyst. It is a metal compound comprising at least one ligand with a weak chemical bond.

"metal catalyst" as used in the present description means: a catalyst comprising at least one metal center that forms the active site. In the context of the present invention a "metal catalyst" is the same as a "transition metal catalyst" wherein the metal is a transition metal.

"metal catalyst precursor" as used in the present description means: a compound that upon activation forms the active metal catalyst.

"metallocene" as used in the present description means: a metal catalyst or metal catalyst precursor typically consisting of two substituted cyclopentadienyl (Cp) ligands bound to a metal active site.

"transition metal" as used in the present description means: a metal from any of the Groups 3-10 of the IUPAC Periodic Table of elements or in other words a Group 3 metal, a Group 4 metal, a Group 5 metal, a Group 6 metal, a Group 7 metal, a Group 8 metal, a Group 9 metal or a Group 10 metal.

"Group 3 metal" as used in the present description means: a metal selected from Group 3 of the IUPAC Periodic Table of elements, being scandium (Sc), yttrium (Y), lanthanum (La) and other lanthanides (Ce—Lu), and actinium (Ac) and other actinides (Th—Lr).

"Group 4 metal" as used in the present description means: a metal selected from Group 4 of the IUPAC Periodic Table of elements, being titanium (Ti), zirconium (Zr) and hafnium (Hf).

"Group 5 metal" as used in the present description means: a metal selected from Group 5 of the IUPAC Periodic Table of elements, being vanadium (V), niobium (Nb) and tantalum (Ta).

"Group 6 metal" as used in the present description means: a metal selected from Group 6 of the Periodic Table of elements, being chromium (Cr), molybdenum (Mo) and tungsten (W).

"Group 7 metal" as used in the present description means: a metal selected from Group 7 of the Periodic Table of elements, being manganese (Mn), technetium (Tc) and rhenium (Re).

"Group 8 metal" as used in the present description means: a metal selected from Group 8 of the Periodic Table of elements, being iron (Fe), ruthenium (Ru) and osmium (Os).

"Group 9 metal" as used in the present description means: a metal selected from Group 9 of the Periodic Table of elements, being cobalt (Co), rhodium (Rh) and iridium (Ir).

"Group 10 metal" as used in the present description means: a metal selected from Group 10 of the Periodic Table of elements, being nickel (Ni), palladium (Pd) and platinum (Pt).

"main group metal" as used in the present description means: a metal that is an element of Groups 1,2, and 13-15 of the IUPAC Periodic Table of elements. In other words, metals of:
* Group 1: lithium (Li), sodium (Na), and potassium (K)
* Group 2: beryllium (Be), magnesium (Mg), and calcium (Ca)
* Group 13: boron (B), aluminum (Al), gallium (Ga), and indium (In)
* Group 14: germanium (Ge), and tin (Sn)
* Group 15: antimony (Sb), and bismuth (Bi)
main group metals also include for the context of the present invention zinc (Zn).

"co-catalyst" as used in the present description means: a compound that activates the metal catalyst precursor to obtain the active metal catalyst.

"scavenger" as used in the present description means: a compound that reacts with impurities present in the polymerization reactor, solvent and monomer feed, thereby preventing poisoning of the catalyst during the olefin polymerization process.

"methylaluminoxane" or "MAO" as used in the present description means: a compound derived from the partial hydrolysis of trimethyl aluminum that serves as a co-catalyst for catalytic olefin polymerization.

"SMAO" as used in the present description means: supported methylaluminoxane, viz. a methylaluminoxane bound to a solid support.

"DMAO" as used in the present description means: depleted methylaluminoxane, viz. a methylaluminoxane from which the free trimethyl aluminum has been removed.

"MMAO" as used in the present description means: modified methylaluminoxane, viz. the product obtained after partial hydrolysis of trimethyl aluminium plus another trialkyl aluminium such as triisobutyl aluminium or tri-n-octyl aluminium.

"fluorinated aryl borate or fluorinated aryl borane" as used in the present description means: a borate compound having three or four fluorinated (preferably perfluorinated) aryl ligands or a borane compound having three fluorinated (preferably perfluorinated) aryl ligands.

"halide" as used in the present description means: an ion selected from the group consisting of: fluoride ($F^-$), chloride ($Cl^-$), bromide ($Br^-$) and iodide ($I^-$).

"halogen" as used in the present description means: an atom selected from the group consisting of: fluorine (F), chlorine (Cl), bromine (Br) and iodine (I).

"heteroatom" as used in the present description means: an atom other than carbon or hydrogen. Heteroatom also includes halides.

"heteroatom selected from Group 14, 15, 16 or 17 of the IUPAC Periodic Table of the Elements" as used in the present description means: a heteroatom selected from Si, Ge, Sn [Group 14], N, P, As, Sb, Bi [Group 15], O, S, Se, Te [Group 16], F, Cl, Br, I [Group 17].

"alkyl" as used in the present description means: a group consisting of carbon and hydrogen atoms having only single carbon-carbon bonds. An alkyl group may be straight or branched, un-substituted or substituted. It may contain aryl substituents. It may or may not contain one or more heteroatoms, such as oxygen (O), nitrogen (N), phosphorus (P), silicon (Si), tin (Sn) or sulfur (S) or halogen (i.e. F, Cl, Br, I).

"aryl" as used in the present description means: a substituent derived from an aromatic ring. An aryl group may or may not contain one or more heteroatoms, such as oxygen (O), nitrogen (N), phosphorus (P), silicon (Si), tin (Sn), sulfur (S) or halogen (i.e. F, Cl, Br, I). An aryl group also encloses substituted aryl groups wherein one or more hydrogen atoms on the aromatic ring have been replaced by hydrocarbyl groups.

"alkoxide" or "alkoxy" as used in the present description means: a substituent obtained by deprotonation of an aliphatic alcohol. It consists of an alkyl group bonded to an oxygen atom.

"aryloxide" or "aryloxy" or "phenoxide" as used in the present description means: a substituent obtained by deprotonation of an aromatic alcohol. It consists of an aryl group bonded to an oxygen atom.

"silyl group" as used in the present description means: a linear, branched or cyclic substituent containing 1-20 silicon atoms. Said silyl group may comprise Si—Si single or double bonds.

Expressions like for example "C1-C20" and similar formulations may refer to a range regarding a number of carbon atoms, here for example from 1 to 20 carbon atoms.

DETAILED DESCRIPTION OF THE INVENTION

The present invention relates to the novel and inventive process for the preparation of graft copolymers comprising a polyolefin main chain and one or a multiple polymer side chains and the products obtained therefrom, which polymers have finely tuned parameters, such as polarity. The polymer side chains may be polar or nonpolar.

The key to the present invention is the use of two different types of olefin monomers in step A): a first type of olefin monomer and a second type of olefin comonomer having a metal-pacified functional group; resulting in a random copolymer containing short chain branches having metal-pacified functional groups, which are subjected to a metal substitution step B) to obtain short chain branches having functional groups which are in turn used as initiator for the subsequent step C), consisting of the formation of the graft copolymer.

The formation of the polymer side chains can either be carried out by growing these polymer side chains from the functional groups (grafting from approach) or by attaching a pre-synthesized polymer to the functional groups of the randomly functionalized polyolefin produced in step B) (grafting onto approach).

Step A) is related to polymerizing at least two different types of monomers, of which at least one type has a metal-pacified functionalized group, using a catalyst system to obtain a polyolefin main chain containing randomly placed metal-pacified short chain branches.

The catalyst system used in step A) comprises: i) a Group 3-10, preferably a Group 3-8, metal catalyst or metal catalyst precursor; ii) optionally a co-catalyst; and iii) optionally a scavenger.

Step B) is related to a reaction with at least one metal substituting agent to remove the pacifier metal function and obtain a polyolefin main chain having one or multiple functionalized short chain branches. In this step the metal is replaced by a non metal atom or group that acts as an initiator group in step C). Non-limiting examples of initiator groups are —OH, —SH, —NR'''H, —NH$_2$. Wherein R''' is a hydrocarbyl group. More examples of functional groups are presented below.

Step C) relates to forming polymer side chains at the short chain branches on the polyolefin main chain obtained in step B). Said polyolefin main chain of step B) contains one or multiple functionalized short chain branches. In other words, step C) relates to the formation of the graft copolymer.

Step C) relates to obtaining a graft copolymer and is carried out by ROP and/or transesterification using the functionalized side chain branches on the polyolefin main chain obtained in step B).

Preferably, said all process steps are carried out directly one after another. Preferably, the process is carried out in a series of reactors.

Each of these steps will be discussed in more detail below and embodiments are discussed below.

Step A): preparation of a polyolefin main chain

The first step in the process according to the present invention is the preparation of a polyolefin main chain that has reactive electrophilic metal pending groups. The product obtained in step A) is a metal-pacified functionalized side chain-containing polyolefin.

During step A) of the inventive process a copolymerization is carried out. At least two different olefin monomers are used; one of which is a functionalized olefin having a heteroatom-containing functional group which functionality has been pacified with a pacifying metal. This copolymerization leads to a random copolymer having one or more metal-pacified functionalized short chain branches.

In an embodiment of the present invention, the first type of olefin monomer has the following structure according to Formula I-A:

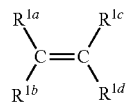

wherein C is carbon and wherein $R^{1a}$, $R^{1b}$, $R^{1c}$, and $R^{1d}$ are each independently selected from the group consisting of H or hydrocarbyl with 1 to 16 carbon atoms.

The hydrocarbyl may for example be an alkyl, alkenyl, alkadienyl and alkynyl. It may also be an alicyclic substituent, such as cycloalkyl, cycloalkadienyl cycloalkenyl. It may also be an aromatic substituent, such as monocyclic or polycyclic aromatic substituent, as well as combinations thereof, such as alkyl-substituted aryls and aryl-substituted alkyls. The hydrocarbyl may be substituted with one or more non-hydrocarbyl-containing groups e.g. a heteroatom.

Preferably, the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, cyclopentene, cyclohexene, norbornene, ethylidene-norbornene, and vinylidene-norbornene and one or more combinations thereof. Preferably, said first type of olefin monomer is ethylene or propylene.

In addition, a combination of for example ethylene and/or propylene on one hand and one or more other olefins on the other hand can also be used as the first type of olefin monomer. Substituted analogues of the monomers discussed above may also be used, e.g. substituted by one or more halogens. Also aromatic monomers may be used according to the present invention. It is also possible to use a combination of two or more olefins, such as a combination of ethylene with α-olefins to arrive at an LLDPE-side chain.

In an embodiment of the present invention, the second, metal-pacified functionalized olefin monomer has the following structure according to Formula I-B:

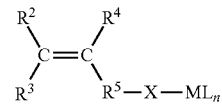

wherein C is carbon, wherein $R^2$, $R^3$, and $R^4$ are each independently selected from the group consisting of H or hydrocarbyl with 1 to 16 carbon atoms, wherein $R^5$—X—$ML_n$ is a metal-pacified heteroatom-containing functional group.

In an embodiment, $R^5$ is either not present in which case $R^5$—X-ML$_n$ can be also written as X-ML$_n$ or in another embodiment $R^5$ is a hydrocarbyl group. It should be noted that when X is a heteroatom-containing group, the heteroatom is bonded to M.

Preferably, X is a heteroatom or heteroatom-containing group selected from the group consisting of:

—O—, —S—, —NR$^{6a}$—, —CO$_2$—, —C(=O)—, —C(=S)S—, —C(=S)O—, —C(=O)N(R$^{6a}$)—, —C(=NR$^{6a}$)O—, —C(=NR$^{6a}$)N(R$^{6b}$)—, —C(=NR$^{6b}$)—, —C(=NR$^{6b}$)N(R$^{6a}$)—, —C(=S)N(R$^{6a}$)—, —C(=NR$^{6a}$)S—, —CH$_2$C(R$^{6a}$)=C(OR$^{6b}$)O—, —CH$_2$C(R$^{6a}$)=C(NR$^{6b}$R$^{6c}$)O—, —CH$_2$C(R$^{6a}$)=P(OR$^{6b}$OR$^{6c}$)O—, —C(R$^{6a}$)=N—, —C(R$^{6a}$)R$^{6b}$C(R$^{6c}$)R$^{6d}$O—, —C(R$^{6a}$)R$^{6b}$C(R$^{6c}$)R$^{6d}$NR$^{6e}$—, —C(=O)—R$^{6a}$—C(=O)O—, —C(R$^{6b}$R$^{6c}$)N(R$^{6a}$)—, —S(=O)$_2$O—, —C(R$^{6a}$)(R$^{6b}$)O—.

Preferably, said heteroatom from said heteroatom-containing group X is O, S, N or one or more combinations thereof.

Preferably, $R^{6a}$, $R^{6b}$, $R^{6c}$, $R^{6d}$, $R^{6e}$ are each independently selected from the group consisting of H or hydrocarbyl with 1 to 16 carbon atoms. Preferably, ML$_n$ is a metal ligated with one or more ligands L. Preferably, n is 0, 1, 2 or 3. Herein the total charge of L$_n$ corresponds to the oxidation state of the metal minus 1.

M is the pacifying metal, preferably selected from the group consisting of: magnesium, calcium, boron, aluminum, gallium, bismuth, titanium, zinc, and one or more combinations thereof.

Preferably, ligand L is independently selected from the group consisting of hydride, hydrocarbyl, halide, alkoxide, aryloxide, amide, thiolate, mercaptate, carboxylate, carbamate, salen, salan, salalen, guanidinate, porphyrin, β-ketiminate, phenoxy-imine, phenoxy-amine, bisphenolate, trisphenolate, alkoxyamine, alkoxyether, alkoxythioether, subcarbonate and subsalicylate or combinations thereof.

In a preferred embodiment, the compound according to Formula I-B is a metal-pacified hydroxyl α-olefin or metal-pacified hydroxyl-functionalized ring-strained cyclic olefin monomer, preferably an aluminum-pacified hydroxyl olefin monomer.

Metal-pacified hydroxyl α-olefin monomers correspond to Formula I-B wherein $R^2$, $R^3$, and $R^4$ are each H and wherein X is —O— and wherein $R^5$ is either —C(R$^{7a}$)(R$^{7b}$)— or a plurality of —C(R$^{7a}$)(R$^{7b}$)— groups, wherein $R^{7a}$, and $R^{7b}$ are each independently selected from the group consisting of H or hydrocarbyl with 1 to 16 carbon atoms. An example of an $R^5$ group is —(CH$_2$)$_9$—.

Metal-pacified hydroxyl-functionalized ring-strained cyclic olefins (also called internal olefins) are typically hydroxyl functionalized norbornenes, preferably metal-pacified 5-norbornene-2-methanol. They correspond to Formula I-B wherein $R^2$ and $R^4$ are H and $R^3$ and $R^5$ together for a ring structure that is functionalized with X-ML$_n$, wherein X is —O—.

Preferably, said metal-pacified functionalized olefin monomer is prepared in situ before the metal catalyst or metal catalyst precursor is added. The metal-pacified functionalized olefin monomer can for example be prepared by the deprotonation reaction of a protic functionalized olefin monomer according to Formula I-C (below) with a metal pacifying agent.

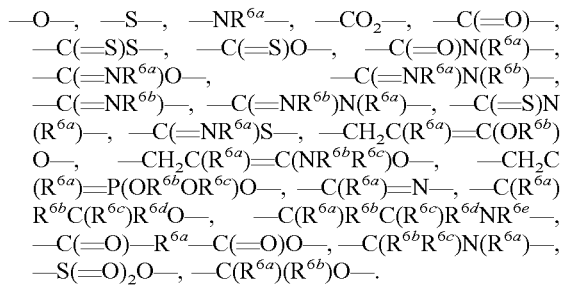

Formula I-C

In an embodiment, the metal pacifying agent is selected from metal hydrocarbyl species L$_n$MR$^{7c}_p$. L, M and n are as specified above. R$^{7c}$ is a hydride or hydrocarbyl with 1 to 16 carbon atoms and p is 1, 2 or 3. Herein the total charge of L$_n$+R$^{7c}_p$ corresponds to the oxidation state of the metal.

Preferably, the metal pacifying agent is a mono-, di- or trihydrocarbyl aluminum, mono-, di- or trihydrocarbyl boron, mono-, di- or trihydro boron, mono-, di- or trihydrocarbyl gallium, mono-, di- or trihydrocarbyl bismuth, mono- or dihydrocarbyl zinc, mono- or dihydrocarbyl magnesium, mono- or dihydrocarbyl calcium, mono-, di-, tri- or tetrahydrocarbyl titanium and one or more combinations thereof.

Preferably, said metal pacifying agent is selected from trimethyl aluminum, triethyl aluminum, tri(i-propyl) aluminum, tri(n-butyl) aluminum, tri-isobutyl aluminum (TIBA), tri(t-butyl) aluminum, tri(n-hexyl) aluminum, tri(n-octyl) aluminum, di(isobutyl) aluminum hydride (DIBALH), dimethyl aluminum 2,6-di(t-butyl)-4-methyl-phenoxide, diethyl aluminum 2,6-di(t-butyl)-4-methyl-phenoxide, di-isobutyl aluminum 2,6-di(t-butyl)-4-methyl-phenoxide, i-butyl aluminum-bis(di-trimethylsilyl)amide), n-octyl aluminum-di(pyridine-2-methoxide), bis(n-octadecyl)-i-butyl aluminum, i-butyl aluminum-bis(di(n-pentyl)amide), n-octyl aluminum-bis(2,6-di-t-butylphenoxide), n-octyl aluminum-diethyl(1-naphthypamide), ethyl aluminum-bis(t-butyldimethylsiloxide), ethyl aluminum-di(bis(trimethylsilyl)amide), ethyl aluminum-bis(2,3,6,7-dibenzo-1-azacycloheptane-amide), n-octyl aluminum-bis(2,3,6,7-dibenzo-1-azacycloheptane-amide), n-octyl-aluminum-bis(dimethyl(t-butyl)siloxide, trimethyl gallium, triethyl gallium, tri-isobutyl gallium, di-n-butyl magnesium (DBM), dimethyl magnesium, butyl-octyl-magnesium, butyl-ethyl-magnesium, butyl magnesium 2,6-di(t-butyl)-4-methyl-phenoxide, benzyl calcium 2,6-di(t-butyl)-4-methyl-phenoxide, methyl zinc 2,6-di(t-butyl)-4-methyl-phenoxide, diethyl zinc (DEZ), dimethyl zinc, di-isopropyl zinc, di-t-butyl zinc, di-(n-hexyl) zinc, ethyl zinc (t-butoxide), ethyl zinc 2,6-di(t-butyl)-4-methyl-phenoxide, trimethyl boron, tributyl boron, diethyl boron 2,6-di(t-butyl)-4-methyl-phenoxide, 9-borabicyclo(3.3.1)nonane, catecholborane, diborane.

In an embodiment, the metal pacifying agent is selected from the group consisting TIBA, DIBALH, DBM, DEZ.

It should be noted that the metal pacifying agent might also act as a chain transfer agent during the polymerization reaction of step A).

Catalyst System Suitable for Use in Step A)

A catalyst system for use in step a) comprises the following components:
i) a metal catalyst or metal catalyst precursor comprising a metal from Group 3-10 of the IUPAC Periodic Table of elements; and
ii) optionally a co-catalyst;
iii) optionally a scavenger.

Suitable metal catalysts and/or metal catalyst precursors are discussed in this section as well as suitable co-catalysts, which are optional. A metal catalyst for step A) can be used without co-catalyst, a metal catalyst precursor for step A) requires a co-catalyst to obtain the actual active catalyst.

Metal Catalyst and/or Catalyst Precursor Suitable for Step A)

In the section below several examples for metal catalysts or metal catalyst precursors, which may be used to prepare the metal catalyst according to the present invention, are specified. Metal catalysts that are suitable for use in step A) of the present invention may be obtained by reacting the metal catalyst precursors with a co-catalyst either prior to use in step A) or by in situ reaction with a co-catalyst.

According to the present invention, the metal catalyst has a metal center selected from a Group 3 metal, a Group 4 metal, a Group 5 metal, a Group 6 metal, a Group 7 metal, a Group 8 metal, a Group 9 metal or a Group 10 metal, preferably Y, Ti, Zr, Hf, V, Cr, Fe, Co, Ni, Pd.

A metal catalyst or a metal catalyst precursor according to the invention may be for example a single-site catalyst or Ziegler-Natta catalyst.

Ziegler-Natta catalyst as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound). An overview of such catalyst types is for example given by T. Pullukat and R. Hoff in Catal. Rev.-Sci. Eng. 41, vol. 3 and 4, 389-438, 1999. The preparation of such a procatalyst is for example disclosed in WO96/32427 A1. Ziegler-Natta catalysts as reported in US2009/0048399, US2014/0350200, WO96/32427, WO01/23441, WO2007/134851, U.S. Pat. No. 4,978,648, EP1283 222A1, U.S. Pat. Nos. 5,556,820; 4,414,132; 5,106,806 and 5,077,357 may also be suitable to use as metal catalyst precursors in the present invention.

The metal catalysts or metal catalyst precursors may for example be a $C_s$-, $C_1$- or $C_2$-symmetric zirconium or hafnium metallocene, preferably an indenyl substituted zirconium or hafnium dihalide, more preferably a bridged bis-indenyl zirconium or hafnium dihalide, even more preferably rac-dimethylsilyl bis-indenyl zirconium or hafnium dichloride (rac-Me$_2$Si(Ind)$_2$ZrCl$_2$ and rac-Me$_2$Si(Ind)$_2$HfCl$_2$, respectively), or rac-dimethylsilyl bis-(2-methyl-4-phenyl-indenyl) zirconium or hafnium dichloride (rac-Me$_2$Si(2-Me-4-Ph-Ind)$_2$ZrCl$_2$ and rac-Me$_2$Si(2-Me-4-Ph-Ind)$_2$HfCl$_2$, respectively).

According to the invention, said catalyst precursor can be for example a so-called half-metallocene, or constrained geometry catalyst, even more preferably, $C_5Me_5[(C_6H_{11})_3P=N]TiCl_2$, $[Me_2Si(C_5Me_4)N(tBu)]TiCl_2$, $[C_5Me_4(CH_2CH_2NMe_2]TiCl_2$. According to the invention, said catalyst can be for example a so-called post-metallocene, preferably $[Et_2NC(N(2,6-iPr_2-C_6H_3)]TiCl_3$ or [N-(2,6-di(1-methylethyl)phenyl)amido)(2-isopropylphenyl)(α-naphthalen-2-diyl(6-pyridin-2-diyl)methane)]hafnium dimethyl.

The metal catalyst or metal catalyst precursor can also be for example a preferably $C_s$ or $C_1$ symmetric compound according to the formula $(C_5R^8_4)R^9(C_{13}R^8_8)ML^1_n$, where $C_5R^8_4$ is an unsubstituted or substituted cyclopentadienyl, and $C_{13}R^{11}_8$ is an unsubstituted fluorenyl group or a substituted fluorenyl group; and the bridging $R^9$ group is selected from the group consisting of —Si(Me)$_2$-, —Si(Ph)$_2$-, —C(Me)$_2$- or —C(Ph)$_2$-, thus producing $C_1$- and $C_s$-symmetric metallocenes.

Non-limiting examples of zirconocene dichloride metal catalyst precursors suitable for use in the present invention include: bis(cyclopentadienyl) zirconium dichloride, bis(methyl-cyclopentadienyl) zirconium dichloride, bis(n-propyl-cyclopentadienyl) zirconium dichloride, bis(n-butyl-cyclopentadienyl) zirconium dichloride, bis(1,3-dimethyl-cyclopentadienyl) zirconium dichloride, bis(1,3-di-t-butyl-cyclopentadienyl) zirconium dichloride, bis(1,3-ditrimethylsilyl-cyclopentadienyl) zirconium dichloride, bis (1,2,4-trimethyl-cyclopentadienyl) zirconium dichloride, bis (1,2,3,4-tetramethyl-cyclopentadienyl) zirconium dichloride, bis(pentamethylcyclopentadienyl) zirconium dichloride, bis(indenyl) zirconium dichloride, bis(2-phenyl-indenyl) zirconium dichloride, bis(fluorenyl) zirconium dichloride, bis(tetrahydrofluorenyl) zirconium dichloride, dimethylsilyl-bis(cyclopentadienyl) zirconium dichloride, dimethylsilyl-bis(3-t-butyl-cyclopentadienyl) zirconium dichloride, dimethylsilyl-bis(3-trimethylsilyl-cyclopentadienyl) zirconium dichloride, dimethylsilyl-bis(tetrahydrofluorenyl) zirconium dichloride, dimethylsilyl-(1-indenyl)(cyclopentadienyl) zirconium dichloride, dimethylsilyl-(1-indenyl)(fluorenyl) zirconium dichloride, dimethylsilyl-(1-indenyl)(octahydrofluorenyl) zirconium dichloride, rac-dimethylsilyl-bis(2-methyl-3-t-butyl-cyclopentadienyl) zirconium dichloride, rac-dimethylsilyl-bis(1-indenyl) zirconium dichloride, rac-dimethylsilyl-bis(4,5,6,7-tetrahydro-1-indenyl) zirconium dichloride, rac-dimethylsilyl-bis(2-methyl-1-indenyl) zirconium dichloride, rac-dimethylsilyl-bis(4-phenyl-1-indenyl) zirconium dichloride, rac-dimethylsilyl-bis(2-methyl-4-phenyl-1-indenyl) zirconium dichloride, rac-ethylene-bis(1-indenyl) zirconium dichloride, rac-ethylene-bis(4,5,6,7-tetrahydro-1-indenyl) zirconium dichloride, rac-1,1,2,2-tetramethylsilanylene-bis(1-indenyl) zirconium dichloride, rac-1,1,2,2-tetramethylsilanylene-bis(4,5,6,7-tetrahydro-1-indenyl) zirconium dichloride, rac-ethylidene(1-indenyl)(2,3,4,5-tetramethyl-1-cyclopentadienyl) zirconium dichloride, rac-[1-(9-fluorenyl)-2-(2-methylbenzo[b]indeno[4,5-d]thiophen-1-yl)ethane]zirconium dichloride, dimethylsilyl bis (cyclopenta-phenanthren-3-ylidene) zirconium dichloride, dimethylsilyl bis(cyclopenta-phenanthren-1-ylidene) zirconium dichloride, dimethylsilyl bis(2-methyl-cyclopenta-phenanthren-1-ylidene) zirconium dichloride, dimethylsilyl bis(2-methyl-3-benz-inden-3-ylidene) zirconium dichloride, dimethylsilyl-bis[(3a,4,5,6,6a)-2,5-dimethyl-3-(2-methyl-phenyl)-6H-cyclopentathien-6-ylidene] zirconium dichloride, dimethylsilyl-(2,5-dimethyl-1-phenylcyclopenta[b]pyrrol-4(1H)-ylidene)(2-methyl-4-phenyl-1-indenyl) zirconium dichloride, bis(2-methyl-1-cyclopenta-phenanthren-1-yl)zirconium dichloride, [ortho-bis(4-phenyl-2-indenyl) benzene] zirconium dichloride, [ortho-bis(5-phenyl-2-indenyl) benzene] zirconium dichloride, [ortho-bis(2-indenyl)benzene] zirconium dichloride, [ortho-bis (1-methyl-2-indenyl)benzene] zirconium dichloride, [2,2'-(1,2-phenyldiyl)-1,1'dimethylsilyl-bis(indenyl)] zirconium dichloride, [2,2'-(1,2-phenyldiyl)-1,1'-(1,2-ethanediyl)-bis (indenyl)] zirconium dichloride, dimethylsilyl-(cyclopentadienyl)(9-fluorenyl) zirconium dichloride, diphenylsilyl-(cyclopentadienyl)(fluorenyl) zirconium dichloride, dimethylmethylene-(cyclopentadienyl)(fluorenyl) zirconium dichloride, diphenylmethylene-(cyclopentadienyl)(fluorenyl) zirconium dichloride, dimethylmethylene-(cyclopentadienyl)(octahydrofluorenyl) zirconium dichloride, diphenylmethylene-(cyclopentadienyl)(octahydrofluorenyl) zirconium dichloride, dimethylmethylene-(cyclopentadienyl)(2,7-di-t-butyl-fluorenyl) zirconium dichloride, diphenylmethylene-(cyclopentadienyl)(2,7-di-t-butyl-fluorenyl) zirconium dichloride, dimethylmethylene-(3-methyl-1-cyclopentadienyl)(fluorenyl) zirconium dichloride, diphenylmethylene-(3-methyl-1-cyclopentadienyl)(fluorenyl) zirconium dichloride, dimethylmethylene-(3-cyclohexyl-1- cyclopentadienyl)(fluorenyl) zirconium dichloride, diphenylmethylene-(3-cyclohexyl-1-cyclopentadienyl)(fluorenyl) zirconium dichloride, dimethylmethylene-(3-t-butyl-1-cyclopentadienyl)(fluorenyl) zirconium dichloride, diphenylmethylene-(3-t-butyl-1-cyclopentadienyl)(fluorenyl) zirconium dichloride, dimethylmethylene-(3-ademantyl-1-cyclopentadienyl)(fluorenyl) zirconium dichloride, diphenylmethylene-(3-ademantyl-1-cyclopentadienyl)(fluorenyl) zirconium dichloride, dimethylmethylene-(3-methyl-1-cyclopentadienyl)(2,7-di-t-butyl-fluorenyl) zirconium dichloride, diphenylmethylene-(3-methyl-1-cyclopentadienyl)(2,7-di-t-butyl-fluorenyl) zirconium dichloride, dimethylmethylene-(3-cyclohexyl-1-cyclopentadienyl)(2,7-di-t-butyl-fluorenyl) zirconium dichloride, diphenylmethylene-(3-cyclohexyl-1-cyclopentadienyl)(2,7-di-t-butyl-fluorenyl) zirconium dichloride, dimethylmethylene-(3-t-butyl-1-cyclopentadienyl)(2,7-di-t-butyl-fluorenyl) zirconium dichloride, diphenylmethylene-(3-t-butyl-1-cyclopentadienyl)(2,7-di-t-butyl-fluorenyl) zirconium dichloride, dimethylmethylene-(3-methyl-cyclopentadienyl)(octahydro-octamethyl-dibenzo-fluorenyl) zirconium dichloride, diphenylmethylene-(3-methyl-cyclopentadienyl)(octahydro-octamethyl-dibenzo-fluorenyl) zirconium dichloride, dimethylmethylene-(3-cyclohexyl-cyclopentadienyl)(octahydro-octamethyl-dibenzo-fluorenyl) zirconium dichloride, diphenylmethylene-(3-cyclohexyl-cyclopentadienyl)(octahydro-octamethyl-dibenzo-fluorenyl) zirconium dichloride, dimethylmethylene-(3-t-butyl-cyclopentadienyl)(octahydro-octamethyl-dibenzo-fluorenyl) zirconium dichloride, diphenylmethylene-(3-t-butyl-cyclopentadienyl)(octahydro-octamethyl-dibenzo-fluorenyl) zirconium dichloride, dimethylmethylene-(3-ademantyl-cyclopentadienyl)(octahydro-octamethyl-dibenzo-fluorenyl) zirconium dichloride, diphenylmethylene-(3-ademantyl-cyclopentadienyl)(octahydro-octamethyl-dibenzo-fluorenyl) zirconium dichloride.

In a preferred embodiment, the metal catalyst or metal catalyst precursor can be for example: [[2,2'-[[[2-(dimethylamino-κN)ethyl]imino-κN]bis(methylene)]bis[4,6-bis(1,1-dimethylethyl) phenolato-κO]] zirconium dibenzyl, (phenylmethyl)[[2,2'-[(propylimino-κN)bis(methylene)]bis[4,6-bis(1,1-dimethylethyl)phenolato-κO]] zirconium dibenzyl or (phenylmethyl)[[2,2'-[[[(2-pyridinyl-κN)methyl]imino-κN]bis(methylene)]bis[4,6-bis(1,1-dimethylethyl) phenolato-κO]] zirconium dibenzyl.

In a preferred embodiment, complexes as reported in WO 00/43426, WO 2004/081064, US 2014/0039138 A1, US 2014/0039139 A1 and US 2014/0039140 A1 are suitable to use as metal catalyst precursors for the processes of the present invention.

Compounds analogous to those listed above but where Zr has been replaced by Hf, so called hafnocenes, may also be used according to the as catalyst precursors present invention.

The metal catalysts or metal catalyst precursors for use in the present invention may also be from post-metallocene catalysts or catalyst precursors.

In a preferred embodiment, the metal catalyst or metal catalyst precursor may be: [HN(CH2CH2N-2,4,6-Me3-C6H2)2]Hf(CH2Ph)2 or bis[N,N'-(2,4,6-trimethylphenyl)amido)ethylenediamine]hafnium dibenzyl.

In a another preferred embodiment, the metal catalyst or metal catalyst precursor may be 2,6-diisopropylphenyl-N-(2-methyl-3-(octylimino)butan-2) hafnium trimethyl, 2,4,6-trimethylphenyl-N-(2-methyl-3-(octylimino)butan-2) hafnium trimethyl.

In a preferred embodiment, the metal catalyst or metal catalyst precursor may be [2,6-iPr2C6H3NC(2-iPr-C6H4)-2-(6-C5H6)]HfMe2-[N-(2,6-di(1-methylethyl)phenyl)amido)(2-isopropylphenyl) (□-naphthalen-2-diyl(6-pyridin-2-diyl)methane)]hafnium dimethyl.

Other non-limiting examples of metal catalyst precursors according to the present invention are: [N-(2,6-di(1-methylethyl)phenyl)amido)(o-tolyl)(α-naphthalen-2-diyl(6-pyridin-2-diyl)methane)] hafnium dimethyl, [N-(2,6-di(1-methylethyl)phenyl)amido)(o-tolyl)(α,α-naphthalen-2-diyl(6-pyridin-2-diyl)methane)] hafnium di(N,N-dimethylamido), [N-(2,6-di(l-methylethyl)phenyl)amido)(o-tolyl)(α,α-naphthalen-2-diyl(6-pyridin-2-diyl)methane)] hafnium dichloride, [N-(2,6-di(1-methylethyl)phenyl)amido)(phenanthren-5-yl)(α,α-naphthalen-2-diyl (6-pyridin-2-diyl)methane)] hafnium dimethyl, [N-(2,6-di(1-methylethyl)phenyl)amido)(phenanthren-5-yl)(α-naphthalen-2-diyl(6-pyridin 2-diyl)methane)] hafnium di(N,N-dimethylamido), [N-(2,6-di(l-methylethyl)phenyl)amido)(phenanthren-5-yl) (α-naphthalen-2-diyl(6-pyridin-2-diyl)methane)] hafnium dichloride. Other non-limiting examples include the family of pyridyl diamide metal dichloride complexes such as: [N-[2,6-bis(1-methylethyl)phenyl]-6-[2-[phenyl(phenylamino-κN)methyl]phenyl]-2-pyridinemethanaminato(2-)-κN1,κN2]hafnium dichloride, [N-[2,6-bis(1-methylethyl)phenyl]-6-[2-[(phenylamino-κN)methyl]-1-naphthalenyl]-2-pyridinemethanaminato(2-)-κN1,κN2] hafnium dichloride, [N-[2,6-bis(1-methylethyl)phenyl]-α-[2-(1-methylethyl)phenyl]-6-[2-[(phenylamino-κN)methyl]phenyl]-2-pyridinemethanaminato(2-)-κN1,κN2] hafnium dichloride, [N-(2,6-diethylphenyl)-6-[2-[phenyl(phenylamino-κN)methyl]-1-naphthalenyl]-2-pyridinemethanaminato(2-)-κN1,κN2]zirconium dichloride, [4-methyl-2-[[2-phenyl-1-(2-pyridinyl-κN)ethyl]amino-κN]phenolato(2-)-κO]bis(phenylmethyl)hafnium bis(phenylmethyl), [2-(1,1-dimethylethyl)-4-methyl-6-[[2-phenyl-1-(2-pyridinyl-κN)ethyl]amino-κN]phenolato(2-)-κO] hafnium bis(phenylmethyl), [2-(1,1-dimethylethyl)-4-methyl-6-[[phenyl(2-pyridinyl-κN)methyl]amino-κN]phenolato (2-)-κO]hafnium bis(phenylmethyl).

Non-limiting examples of titanium dichloride metal catalyst precursors suitable for use in the present invention include: cyclopentadienyl(P,P,P-tri-t-butylphosphine imidato) titanium dichloride, pentafluorophenylcyclopentadienyl(P,P,P-tri-t-butylphosphine imidato) titanium dichloride, pentamethylcyclopentadienyl(P,P,P-tri-t-butylphosphine imidato) titanium dichloride, 1,2,3,4-tetraphenyl-cyclopentadienyl(P,P,P-tri-t-butylphosphine imidato) titanium dichloride, cyclopentadienyl(P,P,P-tricyclohexylphosphine imidato) titanium dichloride, pentafluorophenyl cyclopentadienyl(P,P,P-tricyclohexylphosphine imidato) titanium dichloride, pentamethylcyclopentadienyl(P,P,P-tricyclohexylphosphine imidato) titanium dichloride, 1,2,3,4-tetraphenyl-cyclopentadienyl(P,P,P-tricyclohexylphosphine imidato) titanium dichloride, pentamethylcyclopentadienyl(P,P-dicyclohexyl-P-(phenylmethyl)phosphine imidato) titanium dichloride, cyclopentadienyl(2,6-di-t-butyl-4-methylphenoxy) titanium dichloride, pentafluorophenylcyclopentadienyl(2,6-di-t-butyl-4-methylphenoxy) titanium dichloride, pentamethylcyclopentadienyl(2,6-di-t-butyl-4-methylphenoxy) titanium dichloride, 1,2,3-trimethyl-cyclopentadienyl(2,6-bis(1-methylethyl) phenolato) titanium dichloride, [(3a,4,5,6,6a-n)-2,3,4,5,6-pentamethyl-3aH-cyclopenta[b]thien-3a-yl](2,6-bis(1-methylethyl)phenolato) titanium dichloride, pentamethylcyclopentadienyl(N,N'-bis(1-methylethyl)ethanimidamidato) titanium dichloride, pentamethylcyclopentadienyl(N,N'-dicyclohexylbenzenecarboximidamidato) titanium dichloride, pentamethylcyclopentadienyl(N,N'-bis(1- methylethyl)benzenecarboximidamidato) titanium dichloride, cyclopentadienyl(1,3-bis(1,1-dimethylethyl)-2-imidazolidiniminato) titanium dichloride, cyclopentadienyl (1,3-dicyclohexyl-2-imidazolidiniminato) titanium dichloride, cyclopentadienyl(1,3-bis[2,6-bis(1-methylethyl) phenyl]-2-imidazolidiniminato) titanium dichloride, pentafluorophenylcyclopentadienyl(1,3-bis(1,1-dimethyl-ethyl)-2-imidazolidiniminato) titanium dichloride, pentafluorophenylcyclopentadienyl(1,3-dicyclohexyl-2-imidazolidiniminato) titanium dichloride, pentafluorophenylcyclopentadienyl(1,3-bis[2,6-bis(1-methylethyl)phenyl]-2-imidazolidiniminato) titanium dichloride, pentamethylcyclopentadienyl(di-t-butylketimino) titanium dichloride, pentamethylcyclopentadienyl(2,2,4,4-tetramethyl-3-pentaniminato) titanium dichloride, [(3a,4,5,6,6a-n)-2,4,5,6-tetramethyl-3aH-cyclopenta[b]thien-3a-yl](2,2,4,4-tetramethyl-3-pentaniminato) titanium dichloride, cyclopentadienyl(N,N-bis(1-methylethyl)benzenecarboximidamidato) titanium dichloride, pentafluorophenylcyclopentadienyl(N,N-bis(1-methylethyl) benzenecarboximidamidato) titanium dichloride, pentamethylcyclopentadienyl(N,N-bis(1-methylethyl)benzenecarboximidamidato) titanium dichloride, cyclopentadienyl(2,6-difluoro-N,N-bis(1-methylethyl)benzenecarboximidamidato) titanium dichloride, pentafluorophenylcyclopentadienyl(2,6-difluoro-N,N-bis(1-methylethyl)benzenecarboximidamidato) titanium dichloride, pentamethylcyclopentadienyl(2,6-difluoro-N, N-bis(1-methylethyl)benzenecarboximidamidato) titanium dichloride, cyclopentadienyl(N,N-dicyclohexyl-2,6-difluorobenzenecarboximidamidato) titanium dichloride, pentafluorophenylcyclopentadienyl(N,N-dicyclohexyl-2,6-difluorobenzenecarboximidamidato) titanium dichloride, pentamethylcyclopentadienyl(N,N-dicyclohexyl-2,6-difluorobenzenecarboximidamidato) titanium dichloride, cyclopentadienyl(N,N,N',N'-tetramethylguanidinato) titanium dichloride, pentafluorophenylcyclopentadienyl(N,N,N',N'-tetramethylguanidinato) titanium dichloride, pentamethylcyclopentadienyl(N,N,N',N'-tetramethylguanidinato) titanium dichloride, pentamethylcyclopentadienyl(1-(imino)phenylmethyl)piperidinato) titanium dichloride, pentamethylcyclopentadienyl chromium dichloride tetrahydrofuran complex.

Non-limiting examples of titanium (IV) dichloride metal catalyst suitable for use in the present invention are: (N-t-butylamido)(dimethyl)(tetramethylcyclopentadienyl)silane titanium dichloride, (N phenylamido)(dimethyl)(tetramethylcyclopentadienyl) silane titanium dichloride, (N sec-butylamido)(dimethyl)(tetramethylcyclopentadienyl)silane titanium dichloride, (N sec-dodecylamido) (dimethyl)(fluorenyl)silane titanium dichloride, (3 phenylcyclopentadien-1-yl) dimethyl(t-butylamido) silane titanium dichloride, (3 (pyrrol-1-yl)cyclopentadien-1-yl) dimethyl(t-butylamido)silane titanium dichloride, (3,4-diphenylcyclopentadien-1-yl)dimethyl(t-butylamido) silane titanium dichloride, 3 (3-N,N-dimethylamino)phenyl)cyclopentadien-1-yl)dimethyl(t-butylamido) silane titanium dichloride, (P-t-butylphospho)(dimethyl) (tetramethylcyclopentadienyl) silane titanium dichloride. Other examples are the metal catalyst precursor cited in the list directly above wherein Ln is dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl.

Suitable metal catalyst precursors can be also the trivalent transition metal as those described in WO 9319104 (for example see especially example 1, page 13, line 15).

Suitable metal catalyst precursors can be also the trivalent transition metal as [C5Me4CH2CH2N(n-Bu)2]TiCl2 described in WO 9613529 (for example see especially example III, page 20, line 10-13) or [C5H(iPr)3CH2CH2NMe2]TiCl2 described in WO 97142232 and WO 9742236 (for example see especially example 1, page 26, line 14).

In an embodiment, the metal catalyst precursor is [C5H4CH2CH2NMe2]TiCl2;

In an embodiment, the metal catalyst or metal catalyst precursor may also be [C5Me4CH2CH2NMe2]TiCl2, [C5H4CH2CH2NiPr2]TiCl2, [C5Me4CH2CH2NiPr2]TiCl2, [C5H4C9H6N]TiCl2, [C5H4CH2CH2NMe2]CrCl2, [C5Me4CH2CH2NMe2]CrCl2; [C5H4CH2CH2NiPr2]CrCl2, [C5Me4CH2CH2NiPr2]CrCl2 or [C5H4C9H6N]CrCl2.

A non-limiting list of examples of metal catalyst precursors that would be suitable according to the present invention are: (N,N dimethylamino)methyl-tetramethylcyclopentadienyl titanium dichloride, (N,N dimethylamino)ethyl-tetramethylcyclopentadienyl titanium dichloride, (N,N dimethylamino)propyl-tetramethylcyclopentadienyl titanium dichloride, (N,N dibutylamino)ethyl-tetramethylcyclopentadienyl titanium dichloride, (pyrrolidinyl)ethyl-tetramethylcyclopentadienyl titanium dichloride, (N,N-dimethylamino)ethyl-fluorenyl titanium dichloride, (bis(1-methyl-ethyl)phosphino)ethyl-tetramethylcyclopentadienyl titanium dichloride, (bis(2-methyl-propyl)phosphino)ethyl-tetramethylcyclopentadienyl titanium dichloride, (diphenylphosphino)ethyl-tetramethylcyclopentadienyl titanium dichloride, (diphenylphosphino)methyldimethylsilyl-tetramethylcyclopentadienyl titanium dichloride. Other examples are the catalysts cited in the list directly above wherein Ln wherein the chloride can be replaced with bromide, hydride, methyl, benzyl, phenyl, allyl, (2-N,N-dimethylaminomethyl)phenyl, (2-N,N-dimethylamino)benzyl, 2,6-dimethoxyphenyl, pentafluorophenyl, and/or wherein the metal is trivalent titanium or trivalent chromium.

In a preferred embodiment, the catalyst precursor is: [2-(2,4,6-iPr3-C6H2)-6-(2,4,6-iPr3-C6H2)-C5H3N]Ti(CH2Ph)3 or [Et2NC(N-2,6-iPr2-C6H3)2]TiCl3

Other non-limiting examples of metal catalyst precursors according to the present invention are: {N',N"-bis[2,6-di(1-methylethyl)phenyl]-N,N-diethylguanidinato} titanium trichloride, {N',N"bis[2,6-di(1-methylethyl)phenyl]-N-methyl-N-cyclohexylguanidinato} titanium trichloride, {N', N"-bis[2,6-di(1-methylethyl)phenyl]-N,N-pentamethyl-eneguanidinato} titanium trichloride, {N',N"-bis[2,6-di(methyl)phenyl]-sec-butyl-aminidinato} titanium trichloride, {N-trimethylsilyl,N'—(N",N"-dimethylaminomethyl)benzamidinato} titanium dichloride THF complex, {N-trimethylsilyl, N'—(N",N"-dimethylaminomethyl)benzamidinato} vanadium dichloride THF complex, {N,N'-bis(trimethylsilyl)benzamidinato} titanium dichloride THF complex, {N,N'-bis(trimethylsilyl)benzamidinato} vanadium dichloride THF complex.

In a preferred embodiment, the catalyst precursor can be for example: [C5H3N{CMe=N(2,6-iPr2C6H3)}2]FeCl2, [2,4-(t-Bu)2,-6-(CH=NC6F5)C6H2O]2TiCl2 or bis[2-(1,1-dimethylethyl)-6-[(pentafluorophenylimino)methyl] phenolato] titanium dichloride. Other non-limiting examples of metal catalyst precursors according to the present invention can be for example: bis[2-[(2-pyridinylimino)methyl]phenolato] titanium dichloride, bis[2-(1,1-dimethylethyl)-6-[(phenylimino)methyl]phenolato] titanium dichloride, bis [2-(1,1-dimethylethyl)-6-[(1-naphthalenylimino)methyl]

phenolato] titanium dichloride, bis[3-[(phenylimino)methyl][1,1'-biphenyl]-2-phenolato] titanium dichloride, bis[2-(1,1-dimethylethyl)-4-methoxy-6-[(phenylimino)methyl]phenolato] titanium dichloride, bis[2,4-bis(1-methyl-1-phenylethyl)-6-[(phenylimino)methyl]phenolato] titanium dichloride, bis[2,4-bis(1,1-dimethylpropyl)-6-[(phenylimino)methyl]phenolato] titanium dichloride, bis[3-(1,1-dimethylethyl)-5-[(phenylimino)methyl][1,1'-biphenyl]-4-phenolato] titanium dichloride, bis[2-[(cyclohexylimino)methyl]-6-(1,1-dimethylethyl)phenolato] titanium dichloride, bis[2-(1,1-dimethylethyl)-6-[[[2-(1-methylethyl)phenyl]imino]methyl]phenolato] titanium dichloride, bis[2-(1,1-dimethylethyl)-6-[(pentafluorophenylimino)ethyl]phenolato] titanium dichloride, bis[2-(1,1-dimethylethyl)-6-[(pentafluorophenylimino)propyl]phenolato] titanium dichloride, bis[2,4-bis(1,1-dimethylethyl)-6-[1-(phenylimino)ethyl]phenolato] titanium dichloride, bis[2,4-bis(1,1-dimethylethyl)-6-[1-(phenylimino)propyl]phenolato] titanium dichloride, bis[2,4-bis(1,1-dimethylethyl)-6-[phenyl(phenylimino)methyl]phenolato] titanium dichloride. Other examples are the metal catalyst precursor cited in the list directly above wherein the dichloride can be replaced with dimethyl, dibenzyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

In a preferred embodiment, the catalyst precursor can be: [2-[[[2-[[[3,5-bis(1,1-dimethylethyl)-2-(hydroxy-κO)phenylmethyl]amino-κN]ethyl]methylamino-κN]methyl]-4,6-bis(1,1-dimethylethyl)phenolato(2-)-κO] titanium bis(phenylmethyl), [2,4-dichloro-6-[[[2-[[[3,5-dichloro-2-(hydroxy-κO)phenyl]methyl]amino-κN]ethyl]methylamino-κN]methyl]phenolato(2-)-κO] titanium bis(phenylmethyl), [2-[[[[1-[[2-(hydroxy-κO)-3,5-diiodophenyl]methyl]-2-pyrrolidinyl-κN]methyl]amino-κN]methyl]-4-methyl-6-tricyclo[3.3.1.13,7]dec-1-ylphenolato(2-)-κO] titanium bis(phenylmethyl), [2-[[[2-[[[[2-(hydroxy-κO)-3,5-bis(1-methyl-1-phenylethyl)phenylmethyl]methylamino-κN]methyl]phenyl]methylamino-κN]methyl]-4,6-bis(1-methyl-1-phenylethyl)phenolato(2-)-κO] titanium bis(phenylmethyl), [2,4-dichloro-6-[[[2-[[[3,5-dichloro-2-(hydroxy-κO)phenyl]methyl]amino-κN]methyl]phenyl]amino-κN]methyl]phenolato(2-)-κO] titanium bis(phenylmethyl). Other examples are the metal catalyst precursor cited in the list directly above wherein bis(phenylmethyl) can be replaced with dichloride, dimethyl, diphenyl, 1,4-diphenyl-2-butene-1,4-diyl, 1,4-dimethyl-2-butene-1,4-diyl or 2,3-dimethyl-2-butene-1,4-diyl; and/or wherein the metal may be zirconium or hafnium.

A non-limiting list of examples of chromium catalysts that would be suitable for use in to the present invention are:
(N-t-butylamido)(dimethyl)(tetramethylcyclopentadienyl)silane chromium bis(trimethylsilyl)methyl, (N-phenylamido)(dimethyl)(tetramethylcyclopentadienyl) silane chromium bis(trimethyl)methyl, (N-sec-butylamido)(dimethyl) (tetramethylcyclopentadienyl) silane chromium bis(trimethylsilyl)methyl, (N-sec-dodecylamido)(dimethyl)(fluorenyl)silane chromium hydride triphenylphosphine, (P-t-butylphospho)(dimethyl)(tetramethylcyclopentadienyl) silane chromium bis(trimethylsilyl)methyl. Other examples are the catalysts cited in the list directly above wherein L1 is hydride, methyl, benzyl, phenyl, allyl, (2-N,N-dimethylaminomethyl)phenyl, (2-N,N-dimethylamino)benzyl; in other words chromium methyl, chromium benzyl, chromium allyl, chromium (2-N,N-dimethylamino)benzyl; and/or wherein the metal is trivalent yttrium or samarium; Other examples are metal catalyst precursors as cited in the list directly above wherein Ln is chloride, bromide, hydride, methyl, benzyl, phenyl, allyl, (2-N,N-dimethylaminomethyl)phenyl, (2-N,N-dimethylamino)benzyl and/or wherein the metal is trivalent titanium or trivalent chromium.

Non-limiting examples of metal catalyst precursors according to the present invention are: N,N'-1,2-acenaphthylenediylidenebis(2,6-bis(1-methylethyl)benzenamine) nickel dibromide, N,N'-1,2-ethanediylidenebis(2,6-dimethylbenzenamine) nickel dibromide, N,N'-1,2-ethanediylidenebis(2,6-bis(1-methyl-ethyl)benzenamine) nickel dibromide, N,N'-1,2-acenaphthylenediylidenebis(2,6-dimethylbenzenamine) nickel dibromide, N,N'-1,2-acenaphthylenediylidenebis(2,6-bis(1-methylethyl) benzenamine) nickel dibromide, N,N'-1,2-acenaphthylenediylidenebis(1,1'-biphenyl)-2-amine nickel dibromide. Other examples are the catalysts cited in the list directly above wherein bromide can be replaced with chloride, hydride, methyl, benzyl and/or the metal can be palladium.

Further non-limiting examples of metal catalyst precursors according to the present invention are: [2-[[[2,6-bis(1-methylethyl)phenyl]imino-κN]methyl]-6-(1,1-dimethylethyl)phenolato-κO] nickel phenyl(triphenylphosphine), [2-[[[2,6-bis(1-methylethyl)phenyl]imino-κN]methyl]-6-(1,1-dimethylethyl)phenolato-κO] nickel phenyl (triphenylphosphine), [2-[[[2,6-bis(1-methylethyl)phenyl]imino-κN]methyl]phenolato-κO] nickel phenyl (triphenylphosphine)-, [3-[[[2,6-bis(1-methylethyl)phenyl]imino-κN]methyl][1,1'-biphenyl]-2-olato-κO] nickel phenyl (triphenylphosphine)-, [2-[[[2,6-bis(1-methylethyl)phenyl]imino-κN]methyl]-4-methoxyphenolato-κO] nickel phenyl (triphenylphosphine), [2-[[[2,6-bis(1-methylethyl)phenyl]imino-κN]methyl]-4-nitrophenolato-κO] nickel phenyl (triphenylphosphine), [2,4-diiodo-6-[[[3,3'',5,5''-tetrakis(trifluoromethyl)[1,1':3',1''-terphenyl]-2'-yl]imino-κN]methyl]phenolato-κO] nickel methyl[[3,3',3''-(phosphinidyne-κP)tris[benzenesulfonato]]] trisodium; [2,4-diiodo-6-[[[3,3'',5,5''-tetrakis(trifluoromethyl)[1,1':3',1''-terphenyl]-2'-yl]imino-κN]methyl]phenolato-κO] nickel methyl[[3,3'-(phenylphosphinidene-κP)bis[benzenesulfonato]]]-disodium.

Co-Catalysts Suitable for Step A)

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. $B(R')_y$, wherein R' is a fluorinated aryl and y is 3 or 4, respectively). Examples of a fluorinated borane is $B(C_6F_5)_3$ and of fluorinated borates are $[X]^+[B(C_6F_5)_4]^-$ (e.g. $X=Ph_3C$, $C_6H_5N(H)Me_2$).

Methylaluminoxane or MAO as used in the present description may mean: a compound derived from the partial hydrolysis of trimethyl aluminum that serves as a co-catalyst for catalytic olefin polymerization.

Supported methylaluminoxane or SMAO as used in the present description may mean: a methylaluminoxane bound to a solid support.

Depleted methylaluminoxane or DMAO as used in the present description may mean: a methylaluminoxane from which the free trimethyl aluminum has been removed.

Modified methylaluminoxane or MMAO as used in the present description may mean: modified methylaluminoxane, viz. the product obtained after partial hydrolysis of trimethyl aluminum plus another trialkyl aluminum such as tri(isobutyl) aluminum or tri-n-octyl aluminum.

Fluorinated aryl borates or fluorinated aryl boranes as used in the present description may mean: a borate compound having three or four fluorinated (preferably perfluorinated) aryl ligands or a borane compound having three fluorinated (preferably perfluorinated) aryl ligands.

For example, the co-catalyst can be an organometallic compound. The metal of the organometallic compound can be selected from Group 1, 2, 12 or 13 of the IUPAC Periodic Table of Elements. Preferably, the co-catalyst is an organoaluminum compound, more preferably an aluminoxane, said aluminoxane being generated by the reaction of a trialkyl aluminum compound with water to partially hydrolyze said aluminoxane. For example, trimethyl aluminum can react with water (partial hydrolysis) to form methylaluminoxane (MAO). MAO has the general formula $(Al(CH_3)_{3-n}O_{0.5n})_x \cdot (AlMe_3)_y$ having an aluminum oxide framework with methyl groups on the aluminum atoms.

MAO generally contains significant quantities of free trimethyl aluminum (TMA), which can be removed by drying the MAO to afford the so-called depleted MAO or DMAO. Supported MAO (SMAO) may also be used and may be generated by the treatment of an inorganic support material, typically silica, by MAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Neutral Lewis acid modified polymeric or oligomeric aluminoxanes may also be used, such as alkylaluminoxanes modified by addition of a C1-30 hydrocarbyl substituted Group 13 compound, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

Other examples of polymeric or oligomeric aluminoxanes are tri(isobutyl) aluminum- or tri(n-octyl) aluminum-modified methylaluminoxane, generally referred to as modified methylaluminoxane, or MMAO. In the present invention, MAO, DMAO, SMAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., Chem. Rev. 2000, (100), 1391. Suitable alkylating agents are trialkyl aluminum compounds, preferably TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type $[C]^+[A]^-$ where "C" is a cationic group such as ammonium, phosphonium, oxonium, silylium or sulfonium groups and $[A]^-$ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Scavengers Suitable for Step A)

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Polymerization of the Olefins

Step A) is a step of polymerizing at least two types of olefins to provide a copolymerized polyolefin main chain and this step is preferably carried out in an inert atmosphere.

In the present invention the heteroatom-containing functions on the second type of olefin monomer are in situ protected or pacified by a pacifying metal.

Polymerization of the olefins can for example be carried out in the gas phase below the melting point of the polymer. Polymerization can also be carried out in the slurry phase below the melting point of the polymer. Moreover, polymerization can be carried out in solution at temperatures above the melting point of the polymer product.

It is known to continuously polymerize one or more olefins, such as ethylene or propylene, in solution or in slurry, e.g. in a continuous (multi) CSTR or (multi) loop reactor, in the gas-phase in a reactor with a fluidized or mechanically stirred bed or in a combination of these different reactors, in the presence of a catalyst based on a compound of a transition metal belonging to Groups 3 to 10 of the Periodic Table of the Elements.

For the gas phase process, the polymer particles are kept in the fluidized and/or stirred state in a gaseous reaction mixture containing the olefin(s). The catalyst is introduced continuously or intermittently into the reactor while the polymer constituting the fluidized or mechanically stirred bed is withdrawn from the reactor, also continuously or intermittently. The heat of the polymerization reaction is essentially removed by the gaseous reaction mixture, which passes through heat transfer means before being recycled into the reactor. In addition, a liquid stream may be introduced into the gas-phase reactor to enhance heat removal.

Slurry phase polymerization of olefins is very well known, wherein an olefin monomer and optionally olefin comonomer are polymerized in the presence of a catalyst in a diluent in which the solid polymer product is suspended and transported. Two or more reactors are typically used in such polymerizations when it is desired to produce a multimodal product, in which a polymer made in a first reactor is transferred to a second reactor, where a second polymer having different properties to the first polymer is made in the presence of the first. However, it may also be desirable to connect two reactors making monomodal polymers in order to create a swing monomodal/multimodal plant or to increase the flexibility of two small reactors that individually may lack the scale to be economically viable. A slurry reactor may also be combined with a gas phase reactor.

Slurry phase polymerizations are typically carried out at temperatures in the range 50-125° C. and at pressures in the range 1-40 bar. The catalyst used can be any catalyst typically used for olefin polymerization such as those according to the present invention. The product slurry, comprising polymer and diluent and in most cases also components of the catalyst system, olefin monomer and comonomer can be discharged from each reactor intermittently or continuously, optionally using concentrating devices such as hydrocyclones or settling legs to minimize the quantity of fluids withdrawn with the polymer.

The present invention may also be carried out in a solution polymerization process. Typically, in the solution process, the monomers and polymer are dissolved in an inert solvent.

Solution polymerization has some advantages over slurry processes. The molecular weight distribution and the process variables are more easily controlled because the polymerization occurs in a homogeneous phase using homogeneous single-site catalysts (viz. metal catalysts or metal catalyst precursors consisting of solely one type of catalytically active site). The high polymerization temperature typically above 150° C. also leads to high reaction rates. The solution process is used primarily for the production of relatively low molecular weight and/or low density resins, which are difficult to manufacture by the liquid slurry or gas phase processes. The solution process is very well suited to produce low density products but it is thought much less satisfactory for higher molecular weight resins because of the excessive viscosity in the reactor as discussed by Choi and Ray, JMS Review Macromolecular Chemical Physics C25(l), 1-55, pg. 10 (1985).

Unlike in the gas phase or slurry process, in a solution process there is usually no polymer solid or powder formed. Typically, the reaction temperature and the reaction pressure are higher than in gas phase or slurry process to maintain the polymer in solution. The solution process tends to use an inert solvent that dissolves the polymer as it is formed, subsequently the solvent is separated and the polymer is pelletized. The solution process is considered versatile in that a wide spectrum of product properties can be obtained by varying the composition of the catalyst system, the pressure, the temperature and the comonomer employed.

Since relatively small reactors are used for a solution process, the, residence time is short and grade changeover can be rapid. For example two reactors in series operated at pressures of up to 50 bar and temperatures up to 250° C. in the reactor can be used. Fresh and recycled olefin monomer is compressed up to 55 bar and pumped into the polymerization reactor by a feed pump. The reaction is adiabatic and maintained at a maximum reactor outlet of about 250° C. Although a single reactor can be used, multiple reactors provide a narrower residence time distribution and therefore a better control of molecular weight distribution.

Step B) Metal Substitution Step

In step B) a metal substituting agent is used to remove the pacifying metal or in other words to detach the pacifying metal from the short chain branches and to restore the functionality. Said metal substituting agent may be selected for example from the group consisting of hydrolyzing agents or quenching agents.

In an embodiment, said metal substituting agent is a hydrolyzing agent, selected from the group of protic solvents, e.g. water or an alcohol, such as (acidified) methanol or ethanol, preferably water.

The metal substitution agent may substitute the pacifying metal with a group selected from the group consisting of H, $SiR^7_3$, $SnR^7_3$ or a hydrocarbyl with 1 to 16 carbon atoms. Most preferably hydrogen.

In an embodiment, said metal substituting agent is a quenching agent, which is typically a halogen-containing agent releasing a metal-halide or an anhydride releasing a metal-carboxylate. Typical examples are alkyl halides, especially for example TMS-chloride, and anhydrides.

In one embodiment of the invention, the product obtained after step B) can be premixed with a catalyst to be used in step C) prior to step C)

Step C) Forming of Polymer Side Chains

As discussed above, the graft copolymer is formed during step C). Step C) is hence a step of forming the polymer side chains on the one or multiple functionalized short chain branches to obtain the graft copolymer. In other words, step C) relates to the formation of the polymer side chains, viz. the polymer branches, viz. the graft copolymer. This can be carried out e.g. by ROP. This can also be carried out by means of transesterification with a preformed of a transesterifiable polymer in the sense of the invention may thereby be for example a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly (amide-urethane), poly(amide-urea), poly(urethane-urea) or one or more combination(s) thereof. polymer In case during step C) polar polymer side chains are introduced, the polarity of these may be tuned by e.g. by adding during step C) the combination of multiple cyclic monomers of different polarity, by using a pre-synthesized homopolymer or copolymer with a tuned polarity that can be attached to the polyolefin main chain via ROP and/or transesterification by adding during step C) a combination of multiple polymers of different polarity or at least two different cyclic monomers, or by adding during step C) a combination of at least one cyclic monomer and at least one polymer.

Alternatively, the polarity of the polymer side chains may be tuned by reacting the polyolefin having polar functions obtained in step B) with a combination of a cyclic monomer and a pre-synthesized polymer that can be attached to the polyolefin main chain via transesterification for obtaining the side chains. Both the physical and mechanical properties may be tuned using the process according to the present invention. In addition, the hydrolysis and degradation properties of the polar polymer side chains may be tuned while not affecting the polyolefin main chain.

In case during step C) polyethylene-like polyester side chains are introduced, the copolymers obtained may be used as compatibilizers for polyolefin-PE blends, in particular iPP-PE blends.

In case of a grafting onto approach in step C), the polymers added to be grafted onto the main chain comprise carbonyl group-containing functionalities, for example carboxylic or carbonic acid ester functionalities. It is possibly that said polymer side chains are random copolymers or block copolymers.

In this manner a plurality of polymer blocks or chains are "linked" to said polyolefin main chain comprising the reactive functionalities. In an embodiment, all of the polymer side chains are made of the same monomer(s) but may vary in average molecular weight. By tuning the reactivity and amount of the polymer branches the properties of the graft copolymer obtained can be easily tuned. In an embodiment, the polymer side chains are homopolymers, preferably polar polymers such as polyesters. The polymer side chains may also be random copolymers or block copolymers. The side chains may be all the same or may be different.

In a specific embodiment, the process according to the present invention consists of three successive steps comprising copolymerizing an olefin, such as ethylene, with a metal-pacified functional olefin as comonomer, such as an aluminum-pacified functional (preferably a hydroxyl functionality) olefin, and in a following step, the deprotection of the aluminum-pacified functional olefin and in the last step the addition of cyclic monomers, e.g. lactones, to initiate the ROP using a metal catalyst.

The product of the first step (step A) is a polyolefin having metal-pacified functions. The product of the second step (step B) is a polyolefin having polar functions. Each of said polar functions obtained in step B) can act as a ROP initiator and together with a catalyst in step C) to provide the graft copolymer.

In a specific embodiment, the process according to the present invention consists of three successive steps, the first step being copolymerizing an olefin, such as ethylene, with a metal-pacified functional olefin as comonomer, such as an aluminum-pacified functional (preferably a hydroxyl functionality) olefin, the second step the deprotection of the metal-pacified groups and the subsequent step being attaching polymers comprising carbonyl-containing functionalities as side chains.

Ring-Opening Polymerization Reaction to Grow Polymer Branches

During step C) of the inventive process the polymer side chains may be formed by ROP of cyclic monomers.

The result of step B) is a polyolefin having one or multiple functionalized short side chain branches. These functionalized short side chain branches can be used to initiate ROP.

The cyclic monomers as preferably used by the present invention are oxygen-containing cyclic compounds. The mechanism of ROP is well known to a skilled person and described for example in the Handbook of Ring-Opening Polymerization, 209, Eds. P. Dubois, O. Coulembier, J.-M. Raquez, Wiley VCH, ISBN: 9783527319534. A mixture of cyclic monomer may also be used to form random polymer side chains to tune the properties. Also the sequential addition of different cyclic monomers may be used.

In an embodiment, the cyclic monomer for use in ROP is a polar monomer. The polar cyclic monomer is preferably selected from the group consisting of a lactone, a lactide, a cyclic oligoester (e.g. a di-ester, a tri-ester, a tetra-ester, a penta-ester or higher oligoesters), an epoxide, an aziridine, a combination of epoxide and/or aziridine and $CO_2$, a cyclic anhydride, a combination of epoxide and/or aziridine and a cyclic anhydride, a combination of epoxide and/or aziridine and $CO_2$ and a cyclic anhydride, a cyclic N-carboxyanhydride, a cyclic carbonate, a lactam and one or more combinations thereof.

Lactone is used to prepare polylactone side chains; lactide is used to prepare polylactide side chains; cyclic oligoester (e.g. a di-ester, a tri-ester, a tetra-ester or a penta-ester) is used to prepare different types of polyester side chains; epoxide is used to prepare polyether side chains using ROP; a combination of epoxide and $CO_2$ is used to prepare polycarbonate side chains or poly(carbonate-co-ether) side chains; a combination of epoxide and a cyclic anhydride is used to prepare polyester side chains or polyester-co-ether side chains; a combination of epoxide, cyclic anhydride and $CO_2$ is used to prepare poly(carbonate-co-ester) side chains or poly(carbonate-co-ester-co-ether) side chains; an N-carboxyanhydride is used to produce polypeptide side chains; a carbonate is used to prepare polycarbonate or polycarbonate-co-ether side chains.

Other cyclic monomers are cyclic sulfur-containing compounds such as sulfides; cyclic nitrogen-containing compounds such as amines (aziridines), lactams, urethanes, ureas; cyclic phosphorus-containing compounds such as phosphates, phosphonates, phosphites, phosphines and phosphazenes; and cyclic silicon-containing compounds such as siloxanes, and silyl ethers.

In case the cyclic monomer is a cyclic ester, it may be a cyclic ester having a ring size from 4-40 atoms. Preferably the atoms forming the ring, other than the oxygen of the ester functionality or ester functionalities in the case of cyclic oligoesters, are carbon atoms.

A lactone is a cyclic compound having one ester group; a dilactone is a compound having two ester groups; a trilactone is a compound having three ester groups; a tetralactone is a compound having four ester groups; a pentalactone is a compound having five ester groups; an oligolactone is a compound having 2-20 ester groups.

The cyclic esters, in particular where these are lactones, may be in any isomeric form and may further contain organic substituents on the ring that do not prevent the ROP. Examples of such cyclic esters include 4-methyl caprolactone, ε-decalactone, the lactone of ricinoleic acid (a 10-membered ring with a hexyl branched on the (co-1)-position) or the hydrogenated version of thereof, 13-hexyloxacyclotridecan-2-one (a macrocycle with a hexyl branch on the α-position), and the like. These lactones in which there are at least 10 methylene units in the ring are considered in the context of the present invention to be a nonpolar monomer.

It is further possible that the cyclic ester comprise one or more unsaturations in the ring.

The cyclic ester may further have one or more heteroatoms in the ring, provided that such do not prevent the ROP. Examples of such cyclic esters include 1,4-dioxepan-5-one or 1,5-dioxepan-2-one.

In an embodiment, first a nonpolar monomer is used to form a first polyethylene-like block in the polymer side chain and subsequently a polar monomer is used to form an additional block on the nonpolar block in the polymer side chain. In other words, the side chains in themselves are block-copolymers.

In an embodiment, the polyolefin is isotactic PP, the nonpolar polymer is a polyambrettolide or polypentadecalactone and the polar polymer is polycaprolactone or polylactide.

Transesterification to Add Polymer Side Chains

During step C) a transesterification reaction can be carried out to add polymer side chains to the polyolefin main chain.

The result of step A) is a polyolefin having one or multiple metal-pacified functionalized short side chain branches. These metal-pacified functionalized short side chain branches are deprotected and then used to carry out a transesterification reaction with a transesterifiable polymer.

In the context of the present invention, a transesterification reaction describes a reaction adding one or more polymer side chain reaction to the polyolefin having one or multiple functionalized short side chain branches obtained in step B).

A transesterifiable polymer in the sense of the invention may thereby be for example a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination(s) thereof. The invention moreover relates to polyolefin-based graft copolymers obtained by said process.

Combination of ROP and Transesterification to Add Polymer Side Chains

During step C) of the present process the polymer side chains may be formed by a combination of ROP of cyclic monomers, e.g. lactones, and transesterification.

In an embodiment, besides a pre-synthesized polymer for the side chains also cyclic monomers are added to provide a combination of ROP and transesterification reactions to yield for example a final "polyolefin-g-polar polymer" or "polyolefin-g-polyethylene-like polymer" graft copolymer. This approach provides a versatile method to tune the physical and mechanical properties of the graft copolymer.

In an embodiment, a co-catalyst is present during step C) in case of transesterification reaction. More preferably, when using a Cr- or Co-based catalyst and using epoxides and/or aziridines in combination with $CO_2$ or using epoxides and/or aziridines in combination with cyclic anhydrides or using epoxides and/or aziridines in combination with $CO_2$ and cyclic anhydrides. Examples of a co-catalyst suitable for use are N-methyl-imidazole, 4-dimethylaminopyridine, bis(triphenylphosphoranylidene)ammonium chloride) bis(triphenyl-phosphoranylidene)ammonium azide), tricyclohexylphosphine, triphenylphosphine, tris(2,4,6-trimethoxyphenyl)phosphine and 1,5,7-triazabicyclododecene.

Catalyst that are suitable for the ROP or transesterification reactions are provided below. Specific examples of catalysts include among others mineral acids, organic acids, organic bases, metallic compounds such as hydrocarbyls, oxides, chlorides, carboxylates, alkoxides, aryloxides, amides, salen complexes, β-ketiminato complexes, guanidinato complexes of tin, titanium, zirconium, aluminum, bismuth, antimony, magnesium, calcium and zinc and lipase enzymes.

The amount of additional catalyst for step C) used is selected from a range of for example 0.0001 to 0.5% by weight, preferably 0.001 to 0.1% by weight based on the cyclic ester, or the number of carbonyl functionalities in the polymer added during step C).

After step C) is finished, the graft copolymer is obtained. In an embodiment, the reaction mixture is quenched using a quenching agent, preferably a protic polar reagent, more preferably an alcohol, preferably methanol or ethanol. However, water can also be used. The product obtained after this quenching is a crude product which may contain also the polyolefin obtained in step A) and/or the polymer obtained from the ROP and/or transesterification in step C) that is not attached to the polyolefin main chain. For most applications, however, the crude product may be used as such without further purification.

If the polymer obtained from the ROP and/or transesterification reaction in step C) has to be removed from the product, this crude product may for example be subjected to an additional step of work up. This work up step may comprise a precipitation. For example a precipitation in a solvent, such as THF or other organic solvents, such as chloroform. This can also be called an extraction in case the polymer for the side chains is polar because any polar homopolymer formed will be extracted out of the crude product leaving the graft copolymer and possibly homopolymer of the olefin.

A person skilled in the art will be able to determine the required steps in order to purify the copolymer products, using e.g. one or more precipitation and/or extraction steps using one or more solvents. The product may also be dried prior to use thereof.

Further Embodiments

The present invention relates to a three-step process for the preparation of graft copolymers.

Using the process according to the present invention, graft copolymers can be obtained. In an embodiment, the graft copolymer has an number average molecular weight (Mr) between for example 500 and 1,000,000 g/mol, preferably between 1,000 and 200,000 g/mol.

The polyolefin-based graft copolymers obtained after step C) of the present invention preferably have a polydispersity index ($Đ$) of between 1.1 and 10.0, more preferably between 1.1 and 5.0, more preferably between 1.1 and 4.0, even more preferably between 1.5 and 3.

The polyolefin main chain may be linear or branched (both long chain branched and short chain branched), atactic, isotactic or syndiotactic, preferably, isotactic polyolefins in the case of poly-α-olefins, wherein the isotactic polyolefin is preferably isotactic polypropylene.

According to a specific, non-limiting embodiment of the present invention, the polyolefin main chain may be linear low density polyethylene (LLDPE), high density polyethylene (HDPE), atactic, isotactic or syndiotactic PP (aPP, iPP, sPP, respectively), poly-4-methyl-1-pentene (P4M1P) or atactic, isotactic or syndiotactic polystyrene (aPS, iPS, sPS, respectively).

The graft copolymers according to the present invention may have a mass fraction of polyolefin (mfPol) of between 10% and 90%, preferably between 30% and 70%. The mass fraction mfPol is defined by the mass of the polyolefin divided by the total mass of the copolymer.

The graft copolymers according to the present invention may have a volume fraction of polymer for the side chains (vfPol) of between 90% and 10%, preferably between 70% and 30%. The volume fraction vfPol is defined by the volume of the polymer for the side chains divided by the total volume of the copolymer.

Examples of polymers having a polyolefin main chain and polar polymer side chains that can be prepared using the present method are HDPE-g-PCL, HDPE-g-PLA, HDPE-g-PBA, HDPE-g-PBS, HDPE-g-PEB, HDPE-g-poly(CL-co-PDL), HDPE-g-poly(BA-co-EB), HDPE-g-poly(BA-co-PDL), LLDPE-g-PCL, LLDPE-g-PLA, LLDPE-g-PBA, LLDPE-g-PBS, LLDPE-g-PEB, LLDPE-g-poly(BA-co-EB), LLDPE-g-poly(CL-co-PDL), LLDPE-g-poly(BA-co-PDL), EP-g-PCL, EP-g-PLA, EP-g-PBA, EP-g-PBS, EP-g-PEB, EP-g-poly(BA-co-EB), EP-g-poly(CL-co-PDL), EP-g-poly(BA-co-PDL), aPP-g-PCL, iPP-g-PLA, aPP-g-PBA, aPP-g-PBS, aPP-g-PEB, aPP-g-poly(BA-co-EB), aPP-g-poly(CL-co-PDL), aPP-g-poly(BA-co-PDL), iPP-g-PCL, iPP-g-PLA, iPP-g-PBA, iPP-g-PBS, iPP-g-PEB, iPP-g-poly(BA-co-EB), iPP-g-poly(CL-co-PDL), iPP-g-poly(BA-co-PDL), sPP-g-PCL, sPP-g-PLA, sPP-g-PBA, sPP-g-PBS, sPP-g-PEB, sPP-g-poly(BA-co-EB), sPP-g-poly(CL-co-PDL), sPP-g-poly(BA-co-PDL), iP4M1P-g-PCL, iP4M1P-g-PBA, iP4M1P-g-PBS, iP4M1P-g-PEB, iP4M1P-g-poly(BA-co-EB), iP4M1P-g-poly(CL-co-PDL), iP4M1P-g-poly(BA-co-PDL), aPS-g-PCL, aPS-g-PBA, aPS-g-PBS, aPS-g-PEB, aPS-g-poly(BA-co-EB), aPS-g-poly(CL-co-PDL), aPS-g-poly(BA-co-PDL), iPS-g-PCL, iPS-g-PBA, iPS-g-PBS, iPS-g-PEB, iPS-g-poly(BA-co-EB), iPS-g-poly(CL-co-PDL), iPS-g-poly(BA-co-PDL), sPS-g-PCL, sPS-g-PBA, sPS-g-PBS, sPS-g-PEBL, sPS-g-poly(BA-co-EB), sPS-g-poly(CL-co-PDL), sPS-g-poly(BA-co-PDL) and many other polymers.

Examples of polymers having a polyolefin main chain and polyethylene-like polymer side chains that can be prepared using the present method are HDPE-g-PPDL, HDPE-g-PAmb, HDPE-g-poly(PDL-co-Amb), LLDPE-g-PPDL, LLDPE-g-PAmb, LLDPE-g-poly(PDL-co-Amb), EP-g-PPDL, EP-g-PAmb, EP-g-poly(PDL-co-Amb), aPP-g-PPDL, aPP-g-PAmb, aPP-g-poly(PDL-co-Amb), iPP-g-PPDL, iPP-g-PAmb, iPP-g-poly(PDL-co-Amb), sPP-g-PPDL, sPP-g-PAmb, sPP-g-poly(PDL-co-Amb), iP4M1P-g-PPDL, iP4M1P-g-PAmb, iP4M1P-g-poly(PDL-co-Amb), aPS-g-PPDL, aPS-g-PAmb, aPS-g-poly(PDL-co-Amb), iPS-g-PPDL, iPS-g-PAmb, iPS-g-poly(PDL-co-Amb), sPS-g-PPDL, sPS-g-PAmb, sPS-g-poly(PDL-co-Amb).

Examples of polymers having a polyolefin main chain, and polyethylene-like and polar side chains that can be prepared using the present method are HDPE-g-PPDL-g-PCL, HDPE-g-PAmb-g-PCL, HDPE-poly(PDL-co-Amb)-g-PCL, LLDPE-g-PPDL-g-PCL, LLDPE-g-PAmb-g-PCL, LLDPE-poly(PDL-co-Amb)-g-PCL, EP-g-PPDL-g-PCL, EP-g-PAmb-g-PCL, EP-g-poly(PDL-co-Amb)-g-PCL, aPP-g-PPDL-g-PCL, aPP-g-PAmb-g-PCL, aPP-poly(PDL-co-Amb)-g-PCL, iPP-g-PPDL-g-PCL, iPP-g-PAmb-g-PCL, iPP-poly(PDL-co-Amb)-g-PCL, sPP-g-PPDL-g-PCL, sPP-g-PAmb-g-PCL, sPP-poly(PDL-co-Amb)-g-PCL, iP4M1P-g-PPDL-g-PCL, iP4M1P-g-PAmb-g-PCL, iP4M1P-g-poly(PDL-co-Amb)-g-PCL, aPS-g-PPDL-g-PCL, aPS-g-PAmb-g-PCL, aPS-poly(PDL-co-Amb)-g-PCL, iPS-g-PPDL-g-PCL, iPS-g-PAmb-g-PCL, iPS-poly(PDL-co-Amb)-g-PCL, sPS-g-PPDL-g-PCL, sPS-g-PAmb-g-PCL, sPS-poly(PDL-co-Amb)-g-PCL.

According to a specific, non-limiting embodiment of the present invention, the polyolefin main chain may be HDPE, LLDPE, EP, aPP, iPP, sPP, iP4M1P, aPS, iPS or sPS.

The copolymers prepared according to the present invention may for example be used to introduce polar properties to enhance the interfacial interactions in polyolefins blends with polar polymers or blends with different polyolefins with PEs. They may be used as compatibilizers to improve properties such as adhesion. They may be used to improve barrier properties, especially against oxygen, for polyolefin films. They may be used as compatibilizers to highly polar polymers such as starch or for polyolefin-based composites with inorganic fillers such as glass or talc. They may be used in drug delivery devices, nonporous materials/membranes.

Advantages of the Present Invention

An advantage of the present invention is the versatility allowing the production of graft copolymer having finely tuned properties, such as polarity.

It is preferred that the present process is a so-called "in reactor" process. Preferably, step B) is carried out directly after step A), and step C) directly after step B) preferably in a series of connected reactors, preferably continuously. It should be noted that an extruder is also considered as a reactor in the context of the present invention.

EXAMPLES

The invention is further illustrated by the following non-limiting examples merely used to further explain certain embodiments of the present invention.

Regarding steps A) and B) a polyolefin main chains having a hydroxyl-functionalized short side chain branches were obtained as described below.

All manipulations were performed under an inert dry nitrogen atmosphere using either standard Schlenk or glove box techniques. Dry, oxygen free toluene was employed as solvent for all polymerizations.

Preparation of Polyethylene (HDPE) Main Chain Having Hydroxyl-Functionalized Short Side Chain Branches A mixture of cis-cyclooctene (5 g, 45.5 mmol) and 5-hydroxy-cis-cyclooctene (172 mg, 1.36 mmol), second generation Grubbs catalyst (19.3 mg, 22.7 µmol) and toluene (10.0 mL) were stirred at room temperature for 24 h. The manipulations were carried out in the glovebox. Ethyl vinyl ether (1.7 mg, 22.7 µmol) was added to stop the polymerization after which the polymer was precipitated in acidic methanol. The unsaturated polymers were redissolved in toluene and transferred to a 300 mL stainless steel Büchi reactor. Subsequently, an appropriate amount of Wilkinson's catalyst dissolved in a small amount of toluene (2 mL) was added via syringe and the mixture was stirred for 48 h at 90°

C. under the H$_2$ (20 bar) (step A)). Afterwards, the reaction mixture was quenched in acidified methanol (used as metal substituting agent, step B)), filtered and purified by re-precipitation in methanol. The saturated polymer, obtained with the yield of 94%, was dried under reduced pressure at 80° C. for 24 h.

Preparation of Polypropylene (iPP) Main Chain Having Hydroxyl-Functionalized Short Side Chain Branches The copolymerization of propylene/10-undecen-1-ol using C$_2$-symmetric silyl-bridged zirconocene catalyst rac-Me$_2$Si(2-Me-4-Ph-Ind)$_2$ZrCl$_2$)/MAO has been conducted to synthesize randomly functionalized isotactic polypropylenes. Polymerization reactions were carried out in stainless steel Büchi reactors. Prior to the polymerization, the reactor was dried in vacuo at 40° C. and flushed with h dinitrogen. Toluene solvent (70 mL) was introduced followed by TIBA and the functional monomer under an inert atmosphere. The resulting solution was stirred for 15-20 min followed by the addition of a calculated amount of cocatalyst under dinitrogen atmosphere. The polymerization reaction was started by addition of the catalyst to reactor. The reactor was then pressurized to the desired pressure with propylene and the pressure was maintained for a predefined time (step A)). The propylene feed was stopped and the resulting mixture was quenched in acidified methanol (used as metal substituting agent, step B)), filtered and dried under reduced pressure at 60° C. for 24 h.

All examples below relate to step C) of the process according to the present invention, wherein polymer branches were formed using a previously prepared polyolefin main chain having a hydroxyl-functionalized short side chain branches.

Example 1

Typical procedure for synthesis of HDPE-graft-PCL copolymers: A glass crimp cap vial was charged with ε-caprolactone (CL, 0.547 g 4.8 mmol) and Al-salen catalyst 1 (3.4 mg, 9.7 μmol), randomly functionalized HDPE (70 mg, 9.7 μmol) and toluene (1.50 g, 16.3 mmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 1, entries HDPE-PCL1-HDPE-PCL3 specify the reaction conditions, molecular weight (M$_n$ and M$_w$), Đ and the CL conversion for the present example with catalyst 1.

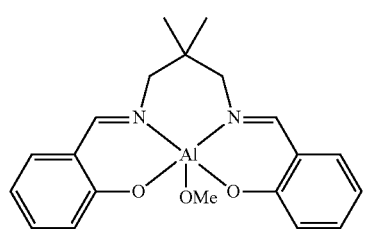

1

Example 2

The same procedure was used as for example 1, with this difference that pentadecalactone (PDL) was used instead of CL. Table 1, entries HDPE-PPDL1-HDPE-PPDL3 specify the reaction conditions, molecular weight (M$_n$ and M$_w$), Đ and the PDL conversion for the present example with PDL.

Example 3

The same procedure was used as for example 1, with this difference that catalyst 2 was used instead of 1. Table 1, entries HDPE-PCL4-HDPE-PCL6 specify the reaction conditions, molecular weight (M$_n$ and M$_w$), Đ and the CL conversion for the present example with catalyst 2.

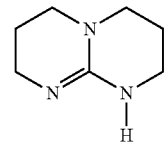

2

Example 4

The same procedure was used as for example 2, with this difference that catalyst 2 was used instead of 1. Table 1, entries HDPE-PPDL4-HDPE-PPDL6 specify the reaction conditions, molecular weight (M$_n$ and M$_w$), Đ and the PDL conversion for the present example with catalyst 2.

TABLE 1

Ring-opening polymerization of CL and PDL initiated by hydroxyl-functionalized HDPE affording polyethylene-polyester graft copolymers.

| entry | cat. | mon/cat./initiator | time [h] | T [° C.] | M$_n$ [g/mol] | Đ | conv. [%] |
|---|---|---|---|---|---|---|---|
| HDPE-PCL1 | 1 | 250/1/1 | 2 | 100 | 20700 | 2.8 | 90 |
| HDPE-PCL2 | 1 | 500/1/1 | 2 | 100 | 85900 | 2.3 | 94 |
| HDPE-PCL3 | 1 | 1000/1/1 | 2 | 100 | 24800 | 2.1 | 97 |
| HDPE-PPDL1 | 1 | 250/1/1 | 5 | 100 | 49400 | 2.4 | 92 |
| HDPE-PPDL2 | 1 | 500/1/1 | 5 | 100 | 59600 | 3.5 | 94 |
| HDPE-PPDL3 | 1 | 1000/1/1 | 5 | 100 | 31400 | 2.5 | 88 |
| HDPE-PCL4 | 2 | 100/1/1 | 24 | 100 | 15500 | 2.3 | 96 |
| HDPE-PCL5 | 2 | 200/1/1 | 24 | 100 | 21900 | 2.3 | 96 |
| HDPE-PCL6 | 2 | 500/1/1 | 24 | 100 | 46600 | 2.1 | 84 |
| HDPE-PPDL4 | 2 | 100/1/1 | 24 | 100 | 13000 | 2.0 | 96 |
| HDPE-PPDL5 | 2 | 200/1/1 | 24 | 100 | 15300 | 1.6 | 93 |
| HDPE-PPDL6 | 2 | 500/1/1 | 24 | 100 | 18100 | 2.1 | 85 |

Example 5

Typical procedure for synthesis of iPP-graft-PPDL copolymers: A glass crimp cap vial was charged with toluene (1.5 mL), PDL (1.1 g, 4.5 mmol), hydroxyl-functionalized iPP (4.9 mg, 8.7 μmol) and catalyst 1 (~3.05 mg, 8.7 μmol). All manipulations were carried out in the glovebox. Then, the mixture was removed from the glovebox and stirred in an oil bath at 100° C. The progress of the reaction was followed by $^1$H NMR spectroscopy by taking aliquots at set time intervals. The synthesized copolymer was cooled to room temperature and quenched using acidified methanol, isolated and dried in vacuum at room temperature for 18 h. Table 2, entry iPP-PPDL1-HDPE-PPDL3 specifies the reaction conditions, molecular weight ($M_n$ and $M_w$), Đ and the PDL conversion for the present example with catalyst 1.

Example 6

The same procedure was used as for example 5, with this difference that catalyst 2 was used instead of 1. Table 2, entry iPP-PPDL4 specifies the reaction conditions, molecular weight ($M_n$ and $M_w$), Đ and the PDL conversion for the present example with catalyst 2.

TABLE 2

Ring-opening polymerization of PDL initiated by hydroxyl-functionalized iPP affording iPP-graft-PPDL copolymers.

| entry | cat. | mon/cat./initiator | time [h] | T [° C.] | $M_n$ [g/mol] | Đ | conv. [%] |
|---|---|---|---|---|---|---|---|
| iPP-PPDL1 | 1 | 250/1/1 | 24 | 100 | 42000 | 2.4 | 95 |
| iPP-PPDL2 | 1 | 500/1/1 | 24 | 100 | 50800 | 2.2 | 94 |
| iPP-PPDL3 | 1 | 1000/1/1 | 24 | 100 | 84800 | 1.9 | 40 |
| iPP-PPDL4 | 2 | 100/1/1 | 24 | 100 | 64400 | 2.0 | 16 |

From the above, the following can be observed. With the method according to the present method a variety of graft copolymers can be obtained by tuning the polyolefin main chain and by tuning the monomer used in the preparation of the polymer side chains. Moreover, several catalyst may be used to prepare the side chain branches.

Analytical Techniques $^1$H NMR analysis carried out at 80-110° C. using TCE-$d_2$ as the solvent and recorded in 5 mm tubes on a Varian Mercury spectrometer operating at frequencies of 400 MHz. Chemical shifts are reported in ppm versus tetramethylsilane and were determined by reference to the residual solvent.

Heteronuclear multiple-bond correlation spectra (HMBC) were recorded with pulse field gradients. The spectral windows for 1H and 13C axes were 6075.3 and 21367.4 Hz, respectively. The data were collected in a 2560×210 matrix and processed in a 1 K×1 K matrix. The spectra were recorded with the acquisition time 0.211 s, relaxation delay 1.4 s and number of scans equal to 144×210 increments.

Solid-state $^{13}$C{$^1$H} Cross-Polarization/Magic-Angle Spinning (CP/MAS) NMR and $^{13}$C{$^1$H} Insensitive Nuclei Enhanced by Polarization Transfer (INEPT) experiments were carried out on a Bruker AVANCE-III 500 spectrometer employing a double-resonance H-X probe for rotors with 2.5 mm outside diameter. These experiments utilized a MAS frequency of 25.0 kHz, a 2.5 µs π/2 pulse for $^1$H and $^{13}$C NMR, a CP contact time of 2.0 ms and TPPM decoupling during acquisition. The CP conditions were pre-optimized using L-alanine. The $^{13}$C{$^1$H} INEPT spectra were recorded using the refocused-INEPT sequence with a J-evolution period of either ⅓ $J_{CH}$ or ⅙ $J_{CH}$ assuming a $^1J_{CH}$ of 150 Hz, i.e. for a J-evolution time of ⅓ $J_{CH}$ the signals from CH and $CH_3$ groups are positive, while those of $CH_2$ are negative. The $^2$D $^1$H-$^1$H double quantum-single quantum (DQ-SQ) correlation experiments and DQ build-up experiments were carried out on a Bruker AVANCE-III 700 spectrometer using a 2.5 mm solid-state MAS double-resonance probe. These experiments employed a spinning frequency of 25.0 kHz. DQ excitation and reconversion was performed using the broadband back-to-back (BaBa) sequence. Chemical shifts for $^1$H and $^{13}$C NMR spectra are reported relative to TMS using solid adamantane as an external.

Size exclusion chromatography (SEC). The molecular weight ($M_n$ and Mw) in g/mol and the Đ were determined by means of high temperature size exclusion chromatography which was performed at 160° C. using a high speed GPC (Freeslate, Sunnyvale, USA). Detection: IR4 (PolymerChar, Valencia, Spain). Column set: three Polymer Laboratories 13 µm PLgel Olexis, 300×7.5 mm. 1,2,4-Trichlorobenzene (TCB) was used as eluent at a flow rate of 1 mL·min$^{-1}$. TCB was freshly distilled prior to use. The molecular weights and the corresponding Đ were calculated from HT SEC analysis with respect to narrow polyethylene standards (PSS, Mainz, Germany). HT SEC of copolymers was performed at 160° C. on a Polymer Laboratories PLXT-20 Rapid GPC Polymer Analysis System (refractive index detector and viscosity detector) with 3 PLgel Olexis (300×7.5 mm, Polymer Laboratories) columns in series. TCB was used as eluent at a flow rate of 1 mL·min-1. The molecular weights ($M_n$ and $M_w$) were calculated with respect to polyethylene standards (Polymer Laboratories). A Polymer Laboratories PL XT-220 robotic sample handling system was used as autosampler.

Differential scanning calorimetry (DSC). Melting ($T_m$) and crystallization ($T_c$) temperatures as well as enthalpies of the transitions were measured by DSC using a DSC Q100 from TA Instruments. The measurements were carried out at a heating and cooling rate of 10° C.·min$^{-1}$ from −60° C. to 160° C. The transitions were deduced from the second heating and cooling curves.

The invention claimed is:

1. A process for the preparation of a graft copolymer comprising a polyolefin main chain and one or multiple polymer side chains, the process comprising the steps of:
   A) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising:
      i) a metal catalyst or metal catalyst precursor comprising a metal from Group 3-10 of the IUPAC Periodic Table of elements;
      ii) optionally a co-catalyst;
   B) reacting the polyolefin main chain having one or multiple metal-pacified functionalized short chain branches obtained in step A) with at least one metal substituting agent to obtain a polyolefin main chain having one or multiple functionalized short chain branches;
   C) forming one or multiple polymer side chains on the polyolefin main chain, wherein as initiators the functionalized short chain branches on the polyolefin main chain obtained in step B) are used to obtain the graft copolymer and a transesterification reaction is carried out to add polymer side chains to the polyolefin main chain,
   wherein step C) of obtaining a graft copolymer is carried out by a combination of ROP using a type of cyclic monomer and a transesterification reaction with a transesterifiable polymer.

2. The process according to claim 1, wherein the first type of olefin monomer is a compound according to Formula I-A:

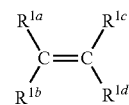

Formula I-A wherein C is carbon and wherein $R^{1a}$, $R^{1b}$, $R^{1c}$, and $R^{1d}$ are each independently selected from the group consisting of H or hydrocarbyl with 1 to 16 carbon atoms.

3. The process according to claim 1, wherein the second type of metal-pacified functionalized olefin monomer is a compound according to Formula I-B:

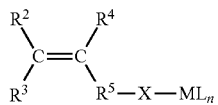

Formula I-B wherein C is carbon;
wherein $R^2$, $R^3$, and $R^4$ are each independently selected from the group consisting of H or hydrocarbyl with 1 to 16 carbon atoms, and
wherein $R^5\text{-}X\text{-}ML_n$ is a main group metal pacified heteroatom-containing functional group, wherein X is a heteroatom or a heteroatom-containing group, M is a metal, L is a ligand, and n is 0 to 3, and wherein the heteroatom that is bonded to M is selected from the group consisting of O, S and N; wherein $R^5$ is a hydrocarbyl with 1 to 16 carbon atoms.

4. The process according to claim 1, wherein step B) is carried out directly after step A) and/or wherein step C) is carried out directly after step B).

5. The process according to claim 1, wherein during step C) an additional catalyst for the ROP and/or transesterification is added.

6. The process according to claim 1, wherein the metal catalyst used in step A) comprises a metal from Group 3-8 of the IUPAC Periodic Table of elements and/or wherein the metal catalyst used in step A) comprises a metal selected from the group consisting of Ti, Zr, Hf, V, Cr, Fe, Co, Ni, Pd.

7. The process according to claim 1, wherein the co-catalyst is selected from the group consisting of MAO, DMAO, MMAO, SMAO and fluorinated aryl borane or fluorinated aryl borate.

8. The process according to claim 1, wherein the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodeceme, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof.

9. The process according to claim 3, wherein a polymer for the side chains and/or a transeterifiable polymer is selected from the group consisting of a polyester, a polycarbonate, a polyamide, a polyurethane, a polyurea, a random or block poly(carbonate-ester), poly(carbonate-ether), poly(ester-ether), poly(carbonate-ether-ester), poly(ester-amide), poly(ester-ether-amide), poly(carbonate-amide), poly(carbonate-ether-amide), poly(ester-urethane), poly(ester-ether-urethane), poly(carbonate-urethane), poly(carbonate-ether-urethane), poly(ester-urea), poly(ester-ether-urea), poly(carbonate-urea), poly(carbonate-ether-urea), poly(ether-amide), poly(amide-urethane), poly(amide-urea), poly(urethane-urea) or one or more combination thereof.

10. The process according to claim 1, wherein the pacifying metal is selected from the group consisting of: magnesium, calcium, boron, aluminum, gallium, bismuth, titanium, zinc, and one or more combinations thereof.

11. A process for the preparation of a graft copolymer comprising a polyolefin main chain and one or multiple polymer side chains, the process comprising the steps of:
A) copolymerizing a first type of olefin monomer and a second type of metal-pacified functionalized olefin monomer using a catalyst system to obtain a polyolefin main chain having a metal-pacified functionalized short chain branch, the catalyst system comprising:
i) a metal catalyst or metal catalyst precursor comprising a metal from Group 3-10 of the IUPAC Periodic Table of elements;
ii) a co-catalyst selected from the group consisting of MAO, DMAO, MMAO, SMAO and fluorinated aryl borane or fluorinated aryl borate;
B) reacting the polyolefin main chain having the metal-pacified functionalized short chain branch obtained in step A) with a metal substituting agent to obtain a polyolefin main chain having a functionalized short chain branch;
C) forming a polymer side chain on the polyolefin main chain, wherein as initiators the functionalized short chain branch on the polyolefin main chain obtained in step B) is used to obtain the graft copolymer and a transesterification reaction is carried out to add polymer side chains to the polyolefin main chain,
wherein the olefin monomer according to Formula I-A is selected from the group consisting of ethylene, propylene, 1-butene, 4-methyl-1-pentene, 1-pentene, 1-hexene, 1-heptene, 1-octene, 1-nonene, 1-decene, 1-undecene, 1-dodeceme, 1-tridecene, 1-tetradecene, 1-pentadecene, 1-hexadecene, 1-heptadecene, 1-octadecene, 1-cyclopentene, cyclohexene, norbornene, ethylidene-norbornene, and vinylidene-norbornene and one or more combinations thereof;
wherein the metal catalyst used in step A) comprises a metal selected from the group consisting of Ti, Zr, and Hf,
wherein step C) of obtaining a graft copolymer is carried out by a combination of ROP using a type of cyclic monomer and a transesterification reaction with a transesterifiable polymer.

12. The process according to claim 1, wherein the metal-pacified functionalized olefin monomer is prepared before the catalyst system is added.

13. The process according to claim 1, wherein the metal-pacified functionalized olefin monomer is prepared by a deprotonation reaction between a protic functionalized olefin monomer according to Formula I-C (below) and a metal pacifying agent:

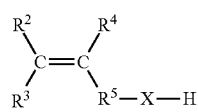

Formula I-C wherein, $R^2$, $R^3$, and $R^4$ are each independently selected from the group consisting of H or hydrocarbyl with 1 to 16 carbon atoms; wherein X is a heteroatom or a heteroatom-containing group, wherein the heteroatom is selected from the group consisting of O, S and N; and wherein $R^5$ is a hydrocarbyl with 1 to 16 carbon atoms; and
wherein the metal pacifying agent has a structure of $L_nMR^{7c}_p$, wherein L is a ligand, M is a metal, $R^{7c}$ is a hydride or hydrocarbyl with 1 to 16 carbon atoms, n is 0 to 3, and p is 1, 2 or 3.

* * * * *